US011021581B2

(12) United States Patent
Barnicki et al.

(10) Patent No.: US 11,021,581 B2
(45) Date of Patent: *Jun. 1, 2021

(54) DURABLE ELASTOMERIC COMPOSITIONS EMPLOYING CYCLODODECASULFUR AS A VULCANIZING AGENT

(71) Applicant: Eastman Chemical Company, Kingsport, TN (US)

(72) Inventors: Scott Donald Barnicki, Kingsport, TN (US); Frederick Ignatz-Hoover, Elyria, OH (US); Robert Thomas Hembre, Johnson City, TN (US); Andrew Neil Smith, Wadsworth, OH (US); Henk Kreulen, Halsteren (NL); Aruna M. Velamakanni, Copley, OH (US); Chenchy Lin, Akron, OH (US); Ronald H. Arthur, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,078

(22) Filed: Mar. 19, 2019

(65) Prior Publication Data

US 2019/0211161 A1    Jul. 11, 2019

Related U.S. Application Data

(63) Continuation-in-part of application No. 15/659,094, filed on Jul. 25, 2017, now Pat. No. 10,280,281, which is a continuation-in-part of application No. 15/015,165, filed on Feb. 4, 2016, now Pat. No. 10,011,663.

(51) Int. Cl.
| | | |
|---|---|---|
| *C08J 3/24* | (2006.01) | |
| *C08L 21/00* | (2006.01) | |
| *C08K 3/06* | (2006.01) | |
| *C08K 5/44* | (2006.01) | |
| *C08K 5/435* | (2006.01) | |
| *C08K 5/38* | (2006.01) | |
| *C08K 5/378* | (2006.01) | |
| *C08K 5/372* | (2006.01) | |
| *B29D 30/06* | (2006.01) | |
| *C08K 3/04* | (2006.01) | |

(52) U.S. Cl.
CPC .............. *C08J 3/246* (2013.01); *C08J 3/24* (2013.01); *C08K 3/06* (2013.01); *C08K 5/372* (2013.01); *C08K 5/378* (2013.01); *C08K 5/38* (2013.01); *C08K 5/435* (2013.01); *C08K 5/44* (2013.01); *C08L 21/00* (2013.01); *B29D 30/0601* (2013.01); *C08J 2307/00* (2013.01); *C08J 2309/02* (2013.01); *C08J 2309/06* (2013.01); *C08K 3/04* (2013.01); *C08L 2207/04* (2013.01); *C08L 2312/00* (2013.01)

(58) Field of Classification Search
CPC .... C08J 3/246; C08J 2309/06; C08J 2309/02; C08L 21/00; C08L 2312/00; C08L 2207/04; C08K 3/06; C08K 5/44; C08K 5/435
USPC ...................................... 525/332.6
See application file for complete search history.

(56) References Cited

U.S. PATENT DOCUMENTS

| | | |
|---|---|---|
| 1,875,372 A | 9/1932 | EndreS |
| 2,419,309 A | 4/1947 | Belchetz |
| 2,419,310 A | 4/1947 | Belchetz |
| 2,460,365 A | 2/1949 | Schallis |
| 2,462,146 A | 2/1949 | Walcott et al. |
| 2,513,524 A | 7/1950 | Schallis |
| 2,534,063 A | 12/1950 | Ross et al. |
| 2,757,075 A | 7/1956 | Haimsohn |
| 3,844,941 A | 10/1974 | Jones |
| 3,891,743 A | 6/1975 | Block |
| 4,017,467 A | 4/1977 | Doss |
| 4,238,470 A | 12/1980 | Young |
| 4,242,472 A | 12/1980 | Hoshino et al. |
| 4,740,559 A | 4/1988 | Johansson et al. |
| 4,752,507 A | 6/1988 | Johansson et al. |
| 4,870,135 A | 9/1989 | Mowood et al. |
| 6,319,993 B2 | 11/2001 | Weidenhaupt et al. |
| 6,420,581 B1 | 7/2002 | Lodaya et al. |
| 6,441,098 B2 | 8/2002 | Halko et al. |
| 6,624,274 B1 | 9/2003 | Suddaby |
| 7,569,639 B2 | 8/2009 | Choi et al. |
| 7,662,874 B2 | 2/2010 | Korth et al. |
| 8,859,719 B2 | 10/2014 | Mohamed et al. |
| 10,011,663 B2 | 7/2018 | Barnicki et al. |
| 10,280,281 B2 | 5/2019 | Barnicki et al. |
| 2009/0048376 A1 | 2/2009 | Nalesnik et al. |
| 2014/0020808 A1 | 1/2014 | Watanabe |
| 2014/0116594 A1 | 5/2014 | Miyazaki |
| 2014/0148540 A1 | 5/2014 | Sandstrom |
| 2014/0200383 A1 | 7/2014 | Marks et al. |
| 2014/0213708 A1 | 7/2014 | Kushida |
| 2017/0002153 A1* | 1/2017 | Osumi ............... C08J 7/123 |
| 2017/0253484 A1 | 9/2017 | Barnicki et al. |
| 2020/0207621 A1 | 7/2020 | Barnicki et al. |
| 2020/0216316 A1 | 7/2020 | Barnicki et al. |

FOREIGN PATENT DOCUMENTS

| | | |
|---|---|---|
| CN | 101 837 958 A | 9/2010 |
| CN | 102 924 762 A | 2/2013 |

(Continued)

OTHER PUBLICATIONS

ASTM D1993-03 (2013).

(Continued)

*Primary Examiner* — Hui H Chin
(74) *Attorney, Agent, or Firm* — Michael K. Carrier

(57) ABSTRACT

Vulcanizable elastomeric formulation are disclosed. The formulations comprise at least one elastomer; a vulcanizing agent comprising cyclododecasulfur; and a prevulcanization inhibitor, present in an amount, for example, from about 0.01 phr to about 10 phr. The formulations, when vulcanized, provide articles that exhibit improved durability.

17 Claims, No Drawings

(56) References Cited

FOREIGN PATENT DOCUMENTS

| CN | 103 601 156 | A | 2/2014 |
|---|---|---|---|
| EP | 0846722 | B1 | 4/2002 |
| EP | 1500630 | A2 | 1/2005 |
| EP | 2128153 | B1 | 8/2013 |
| JP | 1051282 | C | 6/1981 |
| JP | 1979-110250 | A | 8/1982 |
| JP | 1982-133135 | A | 8/1982 |
| JP | 1525614 | C | 10/1989 |
| WO | WO 2003060002 | A1 | 7/2003 |

OTHER PUBLICATIONS

Bueno-Ferrer et al., Journal of Rare Earths, 28, 2010, "Relationship between surface area and crystal size of pure and doped cerium oxides", pp. 647-653.
Chen et al., "Quantitative Analysis of Powder Mixtures by Raman Spectrometry: the influence of particle size and its correction", Analytical Chemistry, 84, 2012, pp. 4088-4094.
Choi et al. "Thermal Aging Behaviors of Elemental Sulfur-Free Polyisoprene Vulcanizates" *Bull. Korean Chem. Soc.*, col. 26, 2005, pp. 1853-1855.
Eckert et al. "Elemental Sulfur and Sulfur-Rich Compounds" *Springer*, 2003, pp. 10-54.
Leste-Lasserre, Pierre "Sulfur Allotrope Chemistry" *McGill University*, 2001, pp. 119-132.
Masamichi Ikeda et al., Radioisotopes, "Measurements of Sulfure Solubility and Diffusibility in Rubber by Tracer Method", vol. 20, No. 10, p. 556, (1973).
Mausle, H.J.; Steudel, R., "Simple preparation of Cyclohexasulfur (S6) from dichlorodisulfane (S2Cl2) and ionic iodides", Z. anorg. allg. Chem. 463, 1980, pp. 27-31.
Steudel, R.; Strauss, R.; Koch, L., "Quantitative HPLC Analysis and Thermodynamics of Sulfur Melts", Angew. Chem. Int. Ed. Engl., 24(1), 1985, pp. 59-60.
Steudel, R..; Mausle, H.-J., "Detection of Large-Ring Sulfur Molecules in Liquid Sulfur: Simple Preparation of S12, α-S18, S20 from S8", Angew. Chem. Int. Ed. Engl., 18(2), 1979, pp. 152-153.
Steudel, R.; Eckert, B., "Solid Sulfur Allotropes", Topics in Current Chemistry (2003), 230, pp. 1-79.
Steudel et al., "Infrared and Raman Spectra of Cyclo Dodecasulphur" Journal of Molecular Spectroscopy, 51, 1974, pp. 189-193.
Schmidt, M.; Block, H.-D., "Occurrence of Cyclododecasulfur in Sulfur Melts", Angew. Chem. Int. Ed. Engl., 6(11), 1967, pp. 955-956.
Schmidt, M.; Wilhelm, E., "Cyclodocecasulfur, S12", Angew. Chem. Int. Ed. Engl., 5(11), 1966, pp. 964-965.
Steudel, R.; Steidel, J.; Sandow, T., "Representation, Crystal Structure and Vibrational Spectra of CycloUndecasulfur and Cyclotridecasulfur", Z. Natureforsch B 1986, 41, pp. 958-970.
Schmidt, M.; Knippschild, G.; Wilhelm, E., "Memorandum on a Simplified Synthesis of Cyclododecasulfure $S_{12}$" Chem. Ber., 101 1968, p. 381-382.
Schmidt, M.; Block, B.; Block, H.D.; Kopf, H.; Wilhelm, E., "Cycloheptasulfur, S7, and Cyclodocecasulfur, S10—Two New Sulfur Rings", Angew. Chem. Int. Ed. Engl., 7(8), 1968, pp. 632-633.
Inorganic Chemistry by Duward Shriver, P.W. Atkins and Cooper Langford, W. H. Freeman & Co., 1990, pp 407-408.
Copending U.S. Appl. No. 15/015,165, filed Feb. 4, 2016, Barnicki, et al. Now U.S. Pat. No. 10,011,663.
Office Action dated Jul. 5, 2016 received in co-pending U.S. Appl. No. 15/015,165.
Office Action dated Jan. 13, 2017 received in co-pending U.S. Appl. No. 15/015,165.
Copending U.S. Appl. No. 15/440,056, filed Feb. 23, 2017, Barnicki, et al. Now Publication No. 2017-0253484.
Copending U.S. Appl. No. 15/440,007, filed Feb. 23, 2017, Barnicki, et al.
Steudel, Ralf, "Elemental Sulfur and Related Homocyclic Compounds and Ions", Studies in Inorganic Chemistry, 1984, v5, p. 3.
PCT International Search Report and Written Opinion dated Mar. 23, 2017 for International Application No. PCT/US2016/067695.
Steudel et al, Thermal Polymerization and Depolymerization Reactions of 10 Sulfer Allotropes Studied by HPLC and DSC, vol. 517, No. 10, pp. 7-42, Oct. 1, 1984.
PCT International Search Report and Written Opinion dated Apr. 19, 2017 for International Application No. PCT/US2017/019881.
Steudel, Ralph et al, "A New Allotrope of Elemental Sulfur: Convenient Preparation of cyclo-S 14 from S 8", Angew. Chem. Int. Ed., Jan. 1, 1998, pp. 2377-2378.
Moeckel, Herman, "Separation of dihydrogen polysulfides (polysulfanes) using reversed-phase HPLC", Fresenius' Zeitschrift Fuer Analytische Chemie, vol. 318, No. 2, 1984, pp. 116-120.
Zysman-Colman, Eli et al., "Probing the chemistry of rare sulfur allotropes: S9, S12 and S20", Journal of Sulfur Chemistry, vol. 29, No. 3-4, 2008, pp. 309-326.
PCT International Search Report and Written Opinion dated May 11, 2017 for International Application No. PCT/US2017/019888.
Office Action dated Jun. 30, 2017 received in co-pending U.S. Appl. No. 15/015,165
Copending U.S. Appl. No. 15/659,094, filed Jul. 25, 2017, Barnicki et al. Now U.S. Pat. No. 10,280,281.
Office Action dated Nov. 22, 2017 received in co-pending U.S. Appl. No. 15/440,007.
Office Action dated Nov. 24, 2017 received in co-pending U.S. Appl. No. 15/440,056.
Buskirk, P.R. Van, et al, Practacle Parameters for Mixing, Rubber Chemistry and Technology, vol. 48, pp. 577-591, May 1975.
Kim, Pan Soo, et al, Flow Visualization of Intermeshing and Separated Counter-Rotating Rotor Internal Mixer, Rubber Chemistry and Technology, vol. 67, pp. 880-891, Apr. 1994.
Manas-Zloczower, I. et al, Dispersive Mixing in Internal Mixers—A Theoretical Model Based on Agglomerate Rupture, vol. 55, pp. 1250-1285, 1982.
Notice of Allowance dated Mar. 20, 2018 received in co-pending U.S. Appl. No. 15/440,056.
Notice of Allowance dated Mar. 26, 2018 received in co-pending U.S. Appl. No. 15/440,007.
Notice of Allowance dated May 3, 2018 received in co-pending U.S. Appl. No. 15/015,165.
Office Action dated May 3, 2018 received in co-pending U.S. Appl. No. 15/659,094.
Copending application U.S. Appl. No. 15/991,122, filed May 29, 2018, Barnicki et al.
Copending U.S. Appl. No. 15/995,574, filed Jun. 1, 2018, Barnicki et al.
Office Action dated Aug. 27, 2018 received in co-pending U.S. Appl. No. 15/991,122
Copending application U.S. Appl. No. 16/123,591, filed Sep. 6, 2018, Barnicki et al.
PCT International Search Report and Written Opinion dated Oct. 9, 2018 for International Application No. PCT/US2018/042402.
Kuznetsov, A. A. et al., "Investigation of the process of vulcanization bypolymeric Sulphur in the metastable state", International Polymer Science and Technology, vol. 29, No. 1, Jan. 2002, pp. T/1-T/3.
Znak, Z.O, et al. Physicochemical Properties of Rubber Compositions Vulcanized by Polymeric Sulfur, Materials Science, vol. 52, No. 3, Nov. 2016, pp. 407-413.
Notice of Allowance dated Dec. 21, 2018 received in co-pending U.S. Appl. No. 15/659,094.
Office Action dated Mar. 7, 2019 received in co-pending U.S. Appl. No. 15/991,122.
Notice of Allowance dated Jun. 24, 2019 received in co-pending U.S. Appl. No. 15/991,122.
Office Action dated Jul. 26, 2019 received in co-pending U.S. Appl. No. 15/995,574.
Office Action dated Oct. 25, 2019 received in co-pending U.S. Appl. No. 15/995,574.
Notice of Allowance dated Nov. 7, 2019 received in co-pending U.S. Appl. No. 15/991,122.

(56) References Cited

OTHER PUBLICATIONS

Notice of Allowance dated Jan. 22, 2020 received in co-pending U.S. Appl. No. 15/995,574.
Copending U.S. Appl. No. 16/815,445, filed Mar. 11, 2020, Barnicki et al.
Office Action dated Mar. 18, 2020 received in co-pending U.S. Appl. No. 16/123,591.
Copending U.S. Appl. No. 16/807,671, filed Mar. 3, 2020, Barnicki et al.
Office Action dated Nov. 12, 2020 received in co-pending U.S. Appl. No. 16/807,671.
Office Action dated Nov. 16, 2020 received in co-pending U.S. Appl. No. 16/815,445.

\* cited by examiner

DURABLE ELASTOMERIC COMPOSITIONS EMPLOYING CYCLODODECASULFUR AS A VULCANIZING AGENT

RELATED APPLICATIONS

This continuation-in-part application claims the priority of U.S. Nonprovisional patent application Ser. No. 15/659,094 filed Jul. 25, 2017, and entitled "PROCESSES FOR FORMING VULCANIZABLE ELASTOMERIC FORMULATIONS AND VULCANIZED ELASTOMERIC ARTICLES," which is in turn a continuation-in-part application claiming priority to U.S. Nonprovisional patent application Ser. No. 15/015,165 filed Feb. 4, 2016 and entitled "VULCANIZING COMPOSITION CONTAINING CYCLODODECASULFUR AND IMPROVED CYCLODODECASULFUR COMPOUND", the entire disclosures of which are incorporated herein by reference.

FIELD OF THE INVENTION

The present invention relates generally to vulcanizable elastomeric compositions that provide improved durability.

BACKGROUND OF THE INVENTION

Sulfur vulcanization is a well-known chemical process for converting natural rubber or other general purpose elastomers into more durable materials via the formation of crosslinks between individual polymer chains through addition of and reaction with certain vulcanizing agents (also known as "sulfur-containing curatives"). In conventional processes for the manufacture of durable vulcanized elastomeric articles, a sulfur-containing curative is mixed with an elastomeric compound to form a vulcanizable elastomeric formulation that includes the sulfur-containing curative. The vulcanizable elastomeric formulation is subjected to a number of processing steps such as for example mixing, extruding, calendering, shaping, forming and building into the shape(s) of a desired "green" (unvulcanized) article or article component ("article"). The article is then subjected to conditions necessary to vulcanize the elastomer and form a vulcanized elastomeric article.

Current industry practice has embraced polymeric sulfur as a preferred vulcanizing agent in many commercial sulfur vulcanization processes. For example, U.S. Pat. No. 4,238,470, the disclosure of which is incorporated herein by reference, describes the use of polymeric sulfur as a sulfur vulcanizing agent for a vulcanizable elastomeric composition. Polymeric sulfur is generally characterized by a high molecular weight, a long, helical molecular structure and insolubility in carbon disulfide and other strong solvents as well as in rubber, rubber compounds and elastomers. In a typical sulfur vulcanization process step, a vulcanizable elastomeric formulation containing polymeric sulfur is subjected to conditions in which the polymeric sulfur converts to cyclooctasulfur ($S_8$), a sulfur allotrope that is soluble in elastomers and oils and which therefore dissolves into the elastomeric formulation wherein it can take part in the vulcanization reactions.

Because the conversion of polymeric sulfur to cyclooctasulfur is temperature dependent and the effects of time and temperature on the conversion are cumulative, great care must be taken to ensure that the processing steps prior to final shaping, building or assembling of the vulcanized article prior to actual vulcanization do not initiate the conversion prior to the actual vulcanization step. Such premature conversion could result in sulfur "bloom", a known phenomenon highly detrimental to interply adhesion and other vulcanized article characteristics. Sulfur bloom is the result of diffusion of soluble cyclooctasulfur and subsequent crystallization of sulfur on the surface of an uncured article and occurs when cyclooctasulfur concentrations in the green vulcanizable elastomeric formulation exceed their solubility limit in the formulation at a given temperature. The presence of sulfur bloom on the surface on an uncured article component or ply is highly detrimental to tack and adhesion of that component to other components or plies. In order to avoid premature conversion to cyclooctasulfur and the risk of bloom in vulcanizable elastomeric formulations with polymeric sulfur vulcanizing agents, current commercial practice includes limiting extended processing times to temperatures below about 110° C. or more preferably 100° C., as even a small percentage of conversion of polymeric sulfur to cyclooctasulfur may push the concentration past the solubility limit and create the potential for bloom. The shearing actions present in (and frictional heat generated by) the mixing, extrusion, calendering, shaping, forming, or other processing operations therefore present demanding temperature control challenges to the article manufacturers.

Management of these challenges typically involves a delicate balance between productivity, throughput, processing speed and product cost on one hand and product performance and quality on the other. Limitations implemented to reduce risk of premature polymeric sulfur conversion and bloom slow the manufacturing speed and thus reduce manufacturer profitability. Conversely a vulcanizing agent with less premature conversion propensity (and accordingly higher thermal stability) would increase manufacturing speed and accordingly the number of units a plant can create and the manufacturer's profit. In addition to faster manufacturing speeds, if the conversion from polymeric to cyclooctasulfur at any given temperature in the manufacturing process could be reduced, then the compounder has greater flexibility to incorporate more sulfur into a vulcanizable composition thereby having greater potential to manufacture goods of even higher quality and durability.

The prior art has attempted to improve polymeric sulfur thermal stability and retard or resist sulfur bloom through use of various stabilizers or stabilization treatments, as described for example in the above-mentioned '470 patent as well as U.S. Pat. Nos. 2,460,365; 2,462,146 and 2,757,075. Despite all these efforts, a continuing need exists for sulfur vulcanizing agents with higher thermal stability that translates to improved throughput and efficiency for vulcanized article manufacturers while avoiding the risks and detriments of bloom.

Highly-reinforcing structural components of complex composite rubber articles such as tires or hoses are based on formulations which are problematic for the industry. Formulations required to achieve the desired performance goals have numerous problems both in processing and performance. The problems arise from the requirements of articles or certain components of articles to possess highly durable modulus or stiffness for reliable, consistent performance. In general, formulations for suitable elastomeric compositions demonstrating high modulus are high in filler, low in plasticizer, and contain high levels of vulcanizing agents; which together, necessarily limit the rate at which these compositions can be processed. Sulfur- or carbon-based vulcanizing agents can be used separately or together to achieve high stiffness. Vulcanizing compositions based entirely on sulfur chemistry produce the most mechanically consistent and durable goods in service, but create significant problems in processing, particularly when using insoluble sulfur. Vulcanizing compositions based totally or in part on carbon chemistry reduce some of these processing difficulties, but produce rigid networks having poor mechanical consistency and durability. The choice of vulcanizing agent therefore provides a critical trade-off in performance between processability and network durability. We have found that vulcanizing compositions comprised of cyclododecasulfur combined with particular vulcanization additives, prevulcanization inhibitors, provide compositions that demonstrate exceptional processability while producing highly durable networks. The problems associated with processing compositions containing polymeric sulfur thus require significant capital investment by modern rubber goods factories in order to mix, extrude, or calender sufficient quantities of shaped components to supply high capacity manufacturing. Formulations which lead to rapid processability while providing improved performance and durability are thus highly desirable.

Vulcanizable elastomeric compositions having utility to produce highly reinforcing structural components are generally formulated to include the following: high molecular weight general purpose elastomer(s), especially natural rubber (NR); high levels of reinforcing filler or fillers such as carbon black, silica or other fillers, the fillers characterized as having small particle size and high surface area; no or very low levels of plasticizers; and high levels of vulcanizing agents suitable to generate high cross-link-density in the finished article. The finished components should possess durability, high stiffness and rigidity in order to carry and distribute forces in the composite article while at the same time providing sufficient flexibility and durability to provide long service lifetimes with little change in performance over the life of the article. The elements of the formulations as stated each contribute to processability considerations for these compounds. The formulations comprised of high molecular weight elastomer (NR), high filler loadings and or low levels of plasticizer produce vulcanizable compositions exhibiting notably high viscosity at conventional processing temperatures. Naturally then, as processing rates are increased, viscous heating leads to increasing temperatures. Processing these vulcanizable compositions at high rates subjects them to elevated temperatures and consequently higher heat histories at odds with the conventional goals of highly-productive, low cost modern manufacturing.

Conversion of polymeric sulfur to cyclooctasulfur further limits the shelf life of inventoried vulcanizable elastomeric compositions as multiple mechanisms for conversion exist. Most critical to conventional polymeric sulfur are pure thermally initiated reactions wherein only heat and no additional chemical reactants are required to elicit the conversion reaction. However, chemically induced mechanisms are additionally available for conversion reactions. Such reactions may be kinetically significant even at temperatures below processing temperatures. The risk of this conversion naturally relates to the extent to which the manufacturer relies on sulfur-based curative to achieve the desired performance characteristics. In order to mitigate these issues manufacturers sometimes resort to vulcanizing compositions based in part on sulfur and in part on carbon-based chemistries. The kinetic significance of both the thermal and chemical processes together impose limitations both to manufacturing rates and also to inventory control over the intermediate mixed vulcanizable elastomeric compositions and formed components. The manufacture of said components are constrained by volume and shelf-life limits which complicates inventory management and limits options for toll production or inter-plant distribution of inventoried materials.

Component stiffness or rigidity can be characterized by compound modulus and geometry including the size and shape of the component. Compounding for high modulus in rubber goods generally leads to vulcanizable compositions characterized as having high viscosity. The compositions require particular combinations of high levels of reinforcing fillers such as carbon black and silica along with network forming (crosslinking) chemicals, primarily insoluble sulfur, and or resins. Crosslinking or network formation in rubber articles is commonly referred to as vulcanization. Vulcanizing agents are materials which by chemical reaction combine with individual polymer chains of the elastomeric composition forming chemical crosslinks between independent chains. The crosslink density, otherwise characterized by the molecular weight between crosslinks, is directly proportional to the modulus of the compound.

Sulfur in various forms is the material of choice for vulcanizing elastomeric compositions due to the durable nature of sulfur crosslinks. High crosslink density can be achieved by high levels of elemental sulfur. However, if the level of sulfur required to generate high modulus exceeds the solubility limit of sulfur in the vulcanizable elastomeric composition at ambient temperatures, sulfur bloom, a common processing problem, can occur. Sulfur bloom is characterized by the appearance of sulfur crystals on the surface of the unvulcanized component of the composite rubber article before it is built into the composite prevulcanized article. Formation of bloom is accompanied by a loss in tack or the stickiness for one piece of rubber to another. Bloom is notoriously bad as it interferes with the interply adhesion of composite layers thereby reducing the final strength and durability of the article. To overcome the problem of sulfur bloom, the industry adopted the use of insoluble sulfur as taught by Endres (U.S. Pat. No. 1,875,372.) Endres showed that use of insoluble sulfur in rubber formulations improved the time a compound remained sticky compared to stocks prepared using conventional cyclooctasulfur.

Use of Insoluble sulfur per se is a significant improvement over the use of cyclooctasulfur, as long as the processing conditions are relatively mild. This is because polymeric insoluble sulfur is a metastable material which is temperature sensitive. In its highly crystalline form, polymeric sulfur will remain insoluble in conventional elastomers for extended periods, so long as it is not subjected to high temperatures, or to chemically reactive species, in particular nucleophilic reagents, strong oxiding or reducing materials, or free radicals. Processing rubber compounds containing polymeric sulfur is generally limited to maintaining rubber compound temperatures typically below 110° C., and preferably below 100° C., during processing steps which require minutes or tens of minutes to complete. Compounds containing insoluble sulfur may be briefly exposed to higher temperatures, but the processes should be completed or the rubber should be cooled to below 100° C. or 110° C. in a matter of minutes or less than a minute. It is apparent then that as high modulus components are desired, high levels of insoluble sulfur would be required. Consequently, as more insoluble sulfur is included in the compound, the temperature sensitivity becomes more and more problematic. For instance, a compound containing 10 wt % polymeric sulfur would require a conversion of only about 5-10% of the polymeric sulfur to cyclooctasulfur before the issue of sulfur bloom becomes problematic.

Carbon based vulcanizing compositions have been employed extensively for many years in vulcanization applications such as structural components of rubber articles. The desirability originates from the ability to build stiffness or modulus without the need for sulfur based vulcanizing compositions. However, such networks are unstable when the rubber article is subjected to mechanical exercises. The network breaks upon deformation or strain and the extent of network degradation is proportionate to the network crosslink density and to the level of strain experienced by the article. Moreover, the strain-destroyed network is permanently lost, leading to mechanical or stress softening of the rubber component. As a result, the compound properties related to the breakage of the resin network such as the hysteresis and heat buildup that are crucial to the rubber durability will be sacrificed.

As a consequence, rubber compositions containing polymeric sulfur are processed at sufficiently low shear rates such that the temperature of the composition is maintained below 110° C. and preferably below 100° C. These reduced rates consequently restrict productivity and therefore increase manufacturing costs. Further, reversion to cyclooctasulfur during normal processing or storage limits the amount of sulfur which can practically be used in a composition. An insoluble form of sulfur with high thermal stability would greatly improve productivity and allow for wider formulation ranges of compositions containing sulfur. An insoluble sulfur vulcanizing agent having thermal stability above 110° C., or even above 135° C. and even above 140° C. or more is thus highly desirable.

To help overcome the problems just described, the industry has resorted to the use carbon based vulcanizing compositions which may be comprised of reinforcing resins and methylene donors, for example, organic crosslinking systems based on phenol, resorcinol, and or cashew nut oil, and formaldehyde, generally supplied as resinous materials, to provide for a reduction in the loading of sulfur required to reach design stiffness specifications. These are described generically herein as reinforcing resins. Partial replacement of polymeric sulfur is thus possible with the use of reinforcing resins, but this solution brings additional difficulties. These reinforcing resins typically increase the compound viscosity thereby making these compounds more difficult to process, and thus not highly processable. Further as mentioned above, finished networks which employ significant levels of these reinforcing resins are prone to stress softening. Stress softening is the phenomena wherein the component losses stiffness irreversibly and permanently at a level proportionate to both carbon-based crosslink density and the degree to which the component is strained. Thus, if a tire component is subjected to a high impact while under a heavy load, components which are formulated with such chemistry will lose stiffness and the performance of the component and consequently the tire will suffer. Generally, this performance degradation manifests itself by the component becoming more compliant and hysteretic. Under continued deformation, this additional compliance leads to increasing structural deformation while the increased hysteresis leads to heat generation. The combination of these effects can lead an accumulation of damage to the crosslinked network, continued degradation in performance and potentially to the catastrophic failure of the rubber component.

U.S. Pat. No. 10,011,663 relates to vulcanizing compositions having improved thermal stability in vulcanizable elastomeric compounds useful to form vulcanized elastomeric articles. These vulcanizing compositions include cyclododecasulfur. U.S. Pat. Publn. No. 2017/0321033 discloses processes that include the steps of mixing an elastomer with a vulcanizing agent to form a vulcanizable elastomeric formulation that includes the vulcanizing agent dispersed in the elastomeric compound, wherein the vulcanizing agent includes a cyclododecasulfur compound. Although prevulcanization inhibitors are disclosed to be useful for such processes, and especially N-(cyclohexylthio)-phthalimide, we have now found that the use of cyclododecasulfur as a vulcanizing agent, in combination with even low levels of a prevulcanization inhibitor such as N-(cyclohexylthio)-phthalimide, improves the chemical stability, provides highly processable vulcanizable elastomeric compositions capable of producing durable elastomeric articles.

SUMMARY OF THE INVENTION

In one aspect, the present invention relates to vulcanizable elastomeric formulations that comprise: at least one elastomer; a vulcanizing agent comprising cyclododecasulfur; and a prevulcanization inhibitor. The formulations are highly processable and, when vulcanized, exhibit improved durability.

Further aspects and areas of applicability will become apparent from the description provided herein. It should be understood that the description and specific examples are intended for purposes of illustration only and are not intended to limit the spirit and scope of the present invention.

DETAILED DESCRIPTION

As utilized herein, the following terms or phrases are defined as follows:

"Cyclododecasulfur" or "cyclododecasulfur compound" means a cyclic allotrope of sulfur in which twelve sulfur atoms are formed into a single homocyclic ring, also referred to herein as $S_{12}$. Cyclododecasulfur is used according to the invention as a vulcanizing agent, alone or in combination with one or more additional vulcanizing agents, for example polymeric sulfur or insoluble sulfur.

"Elastomer" or "rubber" means any polymer which after vulcanization (or crosslinking) and at room temperature can be stretched, compressed or sheared under stress and, upon immediate release of the stress, will return with force to approximately its original proportionate dimensions, including without limitation rubber. Elastomers useful according to the invention include, without limitation, butadiene elastomers, isoprene elastomers, styrene elastomers, and copolymers and mixtures thereof.

"Vulcanizing Agent" means a material efficacious in effecting vulcanization of a vulcanizable formulation when under vulcanization conditions.

"Vulcanizing Composition" means a combination of ingredients usable as an additive to effect vulcanization of a vulcanizable formulation under vulcanization conditions.

"Vulcanizable Elastomeric Formulation" means a composition that includes a vulcanizing agent and an elastomer and that is capable of vulcanization when placed under vulcanization conditions.

The term "reinforcing resin" as used herein means a resin that forms a secondary network or interpenetrating network thereby increasing the modulus of vulcanizable elastomeric formulations when cured. Reinforcing resins may comprise, for example, hydroxyl-functional aromatics that condense with formaldehyde, in some cases forming bonds with the elastomer, while in other cases forming independent domains within the elastomeric network acting as a functional filler. Reinforcing resins may be organic crosslinking systems based, for example, on phenol, resorcinol, and/or cashew nut oil, or other hydroxy-, polyhydroxy-, benzene which may be alkylated or polyalkylated combined with formaldehyde, or formaldehyde-generating precursor such as paraformaldehyde and or methylolated melamines, ureas, or the like which provide for a reduction in the loading of sulfur required to reach design stiffness specifications. In one aspect, then, reinforcing resins are formed of a methylene acceptor and a methylene donor. That is, the reinforcing resins may be comprised, for example, of a methylene acceptor such as a phenol-formaldehyde resin, in an amount from about 1 to about 20 phr, or from 2 to 15 phr, and a methylene donor such as hexamethylenetetramine ("HMT") or hexamethoxymethylmelamine ("HMMM" or "H3M"), in an amount from about 1 to about 10 phr, or from 2 to 8 phr, or from 3 to 7 phr.

Premature vulcanization, or "scorch," of a vulcanizable elastomeric composition refers to a situation occurring during the processing of the composition wherein sufficient crosslinks form such that the composition is no longer plastic and deformable and thus can no longer be processed, mixed, shaped, formed, extruded, calendered, or otherwise manipulated into the desired configuration of size and shape of the desired component or article. The term "prevulcanization inhibitor" or "PVI" means a molecule that prevents premature vulcanization by delaying the formation of crosslinks, allowing for longer processing times and/or processing at higher temperatures. Examples include N-(cyclohexylthiol) phthalimide, or CTP. Employment of a PVI allows for higher speed higher temperature processing not otherwise achievable when the PVI is not employed.

The abbreviation "phr" means the number of parts by weight per 100 parts by weight of rubber or elastomer. For example, in the case of a rubber blend, it would be based on 100 parts by weight of total rubber.

The term "viscosity" of a rubber composition herein, unless otherwise indicated, refers to Mooney Viscosity, defining the standard measure of the viscosity of the rubber. A Mooney viscometer is used to measure the Mooney viscosity. Units of measurement are in Mooney units.

The term "strain-dependent modulus" means the measured modulus depends upon the level of strain or deformation at which the modulus is measured.

The term "strain-dependent softening" or "strain-softening" means that the modulus permanently weakens as strain is increased.

The term "uncured tangent delta" (or tan delta @ mL) refers to the measure of energy loss at minimum torque in a rheometer. The higher the uncured tangent delta, the better the processability of the rubber (i.e. softer, less viscous, lower die swell).

The term "cured tangent delta" (tan delta @ mh) refers to the measure of energy loss at maximum torque in a rheometer. Cured tangent delta often reflects the expected performance of rubber in terms of energy dissipation. Low numbers represent compounds with low energy losses thereby imparting lower rolling resistance (i.e. desirable in a tire for efficient fuel consumption).

The "Payne effect" in rubber compounds refers to a strain-dependent decrease in the elastic modulus of filler-reinforced elastomeric compositions. It is often observed in reinforced rubber compounds containing highly reinforcing and highly associated fillers such as carbon black and silica. It is observed to a lesser extent when the rubber compounds contain non-reinforcing fillers such as various clays, talcs, and quartz. It is a function of filler content and is much lower with unfilled elastomer compositions. In carbon black and silica filled rubber, a relatively high dynamic modulus value is obtained at low strains, for example less than 1%, which decreases at higher strains, for example greater than 10%. Both the magnitude and the strain extent to which the Payne effect is observed depends upon the strength of the associative filler interactions and the concentration or "volume fraction" of filler employed in the elastomeric composition.

The elastic modulus of elastomeric compositions containing reinforcing filler is proportional to the volume fraction of filler in the elastomeric composition (hydrodynamic effect) and the filler structure. Polar and/or dispersion forces of filler particle surfaces generate associative forces driving inter-particle contact between individual particles dispersed in an elastomer. The irregular shapes of particles trap a portion of the volume of the elastomeric component between associated particles. At low deformation, the associative forces are not overcome; clusters of associated particles behave as single individual filler particles having a volume fraction equivalent to the sum of the volumes of the particles and the volume of trapped elastomeric component within the cluster. The elastomeric deformation is largely constrained to the free elastomeric volume not trapped by the interparticle associations. As deformation increases, breaking and reforming of weak associations of filler particles within and between clusters releases trapped elastomeric material allowing it to participate in deformation. As such, the effective volume fraction of filler is reduced proportionately to the volume of trapped elastomer released by the deformation; the effective elastomeric modulus decreases proportionately. The Payne effect is thus attributed to the formation of a filler network governed by particle-to-particle associative forces. The magnitude of the Payne effect is indicative of the extent of filler networking. Since the interparticle attractive forces are non-elastic, or hysteretic, compounds having high Payne effect values tend to be less "energy efficient", exhibiting higher rolling resistance than compounds with lower Payne effect values. Thus, higher Payne effect for filled elastomeric formulations are clearly undesirable for numerous applications such as tire and tread formulations, conveyor belts, energy transmission belts, and other applications where low hysteresis or low rolling resistance is desired. The Payne effect may be measured as the difference of the dynamic moduli of a rubber or elastomeric formulation measured at high strain and at low strain.

In a first aspect, the present invention is directed to a vulcanizing composition for use in forming a vulcanized article. The composition includes a vulcanizing agent wherein the vulcanizing agent includes a cyclododecasulfur compound. It has been unexpectedly discovered that the vulcanizing agent in the vulcanizing composition of the present invention demonstrates improved thermal stability in a vulcanizable formulation usable to form a vulcanized article. In a preferred embodiment, the vulcanizable formulation is a vulcanizable elastomeric formulation and the vulcanized article is a vulcanized elastomeric article.

In another aspect, the invention relates to vulcanizable elastomeric formulations that comprise: at least one elastomer; a vulcanizing agent comprising cyclododecasulfur; and a prevulcanization inhibitor.

Preferably, the vulcanizing agent of the vulcanizing composition of the present invention includes a cyclododecasulfur compound characterized by a DSC melt point onset of from 155° C. to 1670° C. when measured at a DSC heat rate of 20° C./minute.

The vulcanizing composition of the present invention may further include a carrier. Suitable carriers for the vulcanizing composition are typically non-elastomeric and substantially inert with respect to the cyclododecasulfur of the present invention and may include any one or more additional ingredients for example process oil, stearic acid, cellulosic binder such as a carboxymethylcellulose, cellulose ether or esters, xanthans and the like, vegetable oil, epoxidized vegetable oil, polymeric binder or dispersing agent such as a general purpose elastomer or olefinic polymer or copolymer.

The vulcanizing agent in the vulcanizing composition of the present invention preferably includes from about 20% to 100% by weight, more preferably from about 40% to about 100% by weight, cyclododecasulfur compound based on the total weight of the vulcanizing composition. While these ranges are preferred, it will be understood by one of ordinary skill that vulcanizing compositions with amounts of cyclododecasulfur compound lower than the preferred ranges may be contemplated when the vulcanizing composition further includes as a component of the vulcanizing agent other known vulcanizing agents such as sulfur-containing curatives, for example polymeric sulfur, cyclooctasulfur and the like, as well as non-sulfur based curatives such as peroxides. A preferred vulcanizing composition of the present invention therefore includes a vulcanizing agent that optionally further includes one or more sulfur-containing curatives selected from the group consisting of polymeric sulfur and cyclooctasulfur.

The vulcanizing composition may also include one or more optional ingredients that are listed below as optional ingredients for the vulcanizable elastomeric formulation of the present invention, such as polymeric sulfur, flow aids, fatty acids, zinc oxide, accelerators, activators, prevulcanization inhibitors, acid retarders, antidegradants, antireversion agents, prevulcanization inhibitors, plasticizers or other compounding ingredients or additives to further enhance the characteristics and/or improve the performance of the vulcanizing composition, the processability of the elastomeric formulation, the elastomeric formulation of which it is a component or the elastomeric article formed from the elastomeric formulation. In one embodiment, the vulcanizing composition includes at least one of an antireversion agent and a prevulcanization inhibitor. Suitable antireversion agents and prevulcanization inhibitors and retarders are described below with respect to the vulcanizable elastomeric formulation of the present invention. Particularly suitable antireversion agents are selected from the group consisting of hexamethylene-1,6-bis(thiosulfate), disodium salt, dihydrate and 1,3-bis(citraconamidomethyl)benzene while a particularly suitable prevulcanization inhibitor is N-(cyclohexylthio)-phthalimide.

As discussed above, the vulcanizing composition of the present invention is preferably useful in an embodiment wherein the vulcanizable elastomeric formulation is a vulcanizable elastomeric formulation and the vulcanized article is a vulcanized elastomeric article. Accordingly, in another aspect, the present invention is directed to a vulcanizable elastomeric formulation. The vulcanizable elastomeric formulation of the present invention includes at least one elastomer and a vulcanizing agent, wherein the vulcanizing agent is a cyclododecasulfur compound. Preferably, the cyclododecasulfur compound is characterized by a DSC melt point onset of from about 155° C. to about 1670° C. when measured at a DSC heat rate of 20° C./minute. Preferably, the cyclododecasulfur compound is added to the elastomer by mixing a vulcanizing composition that includes the vulcanizing agent as a component with the elastomer such that the vulcanizable elastomeric formulation of the present invention preferably includes at least one elastomer and the vulcanizing composition of the present invention.

In the present invention, we have discovered that the use of a vulcanizing agent comprising cyclododecasulfur as the primary vulcanizing agent assists in overcoming the basic problem of processing temperature limitations due to the thermal reversion of insoluble sulfur. Further, it is now possible to develop vulcanized formulations which do not require reinforcing resins to achieve a suitably high modulus. Further, vulcanized compositions in which cyclododecasulfur are used have a high strain-dependent modulus that is shown to be more persistent and durable than compounds generated from conventional systems based on carbon-based reinforcing resin networks or mixed carbon-sulfur networks. Further, stiffness in these compounds can be generated by employing higher volume fractions of carbon black or silica, or combinations thereof, without the penalty of cyclooctasulfur generation from the increased temperature generated by compounds having higher filler loading. Network durability, flex-fatigue life, and tear resistance is further improved when reversion-resisting chemistry is employed in the formulations employing cyclododecasulfur. These reversion-resisting formulations provide further protection to the compound even when "overcure" situations are present. Thus, large composite structures can be cured to form durable networks at conventional temperatures or even at elevated temperatures which facilitate production speed by generating shorter curing cycles.

The use of prevulcanization inhibitors is known in the industry in assisting rubber processing to inhibit the onset of vulcanization, ideally without affecting the rate or extent of vulcanization. We have discovered that the employment of prevulcanization inhibitors in combination with polymeric sulfur suppresses the conversion to cyclooctasulfur to some extent. Surprisingly and unexpectedly, employing prevulcanization inhibitors with cyclododecasulfur formulations has a much stronger effect on the suppression of cyclooctasulfur formation.

The formulations of structurally reinforcing compositions comprised of high molecular weight elastomer, high loading of filler, and cyclododecasulfur, along with additives comprising prevulcanization inhibitor, that is, reversion-resisting chemicals, allows reduced levels or elimination of reinforcing resins while providing vulcanizable elastomeric formulations that allow faster processing than previously known compositions, while providing greater durability and consistency in performance over the life of the article. Further, these vulcanizable elastomeric formulations allow for greater manufacturing flexibility, including alternative manufacturing techniques which previously were inaccessible to highly reinforcing structural formulations, providing greater manufacturing versatility and efficiency.

Conventional bead apex compound technologies may include use of hardening resins to impart stiffness to the apex. The hardening results in desirable high cured stiffness, however, has the drawback of high uncured compound Mooney viscosity. The high uncured compound Mooney results in use of extrusion process to form the apex geometry. The extruded apex has a drawback in that, when applied to bead wire bundle, the apex must be spliced together. In situations where the splice is not perfectly made, the splice can have overlaps when too long, or slight gaps when too short. When the tire is assembled, it is possible the body ply cords coincident with the apex splice will fall "out-of-plane" resulting in cord spacing anomalies that may result in cured tire sidewall appearance undulations, and/or negative affect on tire uniformity. Use of injection molding to form a bead filler "anulus" having no splice may eliminate cord spacing issues otherwise associated with conventional splice. If bead apex stiffness can be developed using chemistries other than hardening resins, the compound Mooney could be low enough to allow success injection molding of typical height, and even high height bead fillers found in various tires designs. The use of cyclododecasulfur to replace hardening resins (while avoiding sulfur bloom based on cyclododecasulfur resistance to thermal reversion to soluble sulfur) can result in lower Mooney apex compound suitable for injection molding process.

According to the invention, the stiffness, deformation-softening, and heat buildup of structural components which conventionally include reinforcing resins are greatly improved with the reinforcing resin being partially or completely replaced by a higher loading of sulfur enabled by cyclododecasulfur. The superior thermal stability of the formulations of the invention allows higher sulfur loading for tire applications without blooming. The increase in rubber network durability according to the invention is realized by the replacing carbon based vulcanizing agents with vulcanizing agent comprising of cyclododecasulfur to enhance the compound stiffness. Perhaps more importantly, doing so also greatly reduces the strain-softening issues present in compounds that employ reinforcing resins. The improved mechanical stiffness, less strain-softening, and resistance to heat buildup are essential for tire applications. Tire durability as well as the stability of properties upon mechanical aging during tire service are thus expected to be improved leading to better tire performance.

According to the present invention, we show that the loss of mechanical properties (strain-softening), hysteresis, and heat buildup can be improved by increasing the extent of sulfur crosslink network by use of high loading of cyclododecasulfur, for example in an amount as 25 phr or higher. Thus, the amount of cyclododecasulfur may vary from as low as 1 phr up to about 25 phr, or from 1.5 to 20 phr, or from 2 to 18 phr, for example. The use of such high levels of sulfur to achieve the desired performance is only possible under conventional tire processing, so far as we are aware, with the employment of cyclododecasulfur. For reference, the cyclooctasulfur solubility limit in elastomeric compositions is typically about 1-1.5 phr at room temperature, varying by the elastomer and various other ingredients employed. Conventional insoluble sulfur at higher loading, that is without the superior thermal stability provided by cyclododecasulfur, will revert to the soluble sulfur (cyclooctasulfur, C—$S_8$) to the extent that easily exceeds the solubility limit that causes blooming. By using the highly thermal stable cyclododecasulfur of the invention, in combination with PVIs, we demonstrate that the cyclooctasulfur content in stocks having as high as 10 phr of cyclododecasulfur is only 0.134 phr, which is far lower than the cyclooctasulfur solubility limit in the NR after mixing. Therefore, with the use of cyclododecasulfur in combination with PVI, a higher loading (for example 10 phr or higher) can be realized without concerns of blooming.

In one aspect, then, the invention relates to vulcanizable elastomeric formulations that comprise: at least one elastomer; a vulcanizing agent comprising cyclododecasulfur; and a prevulcanization inhibitor.

The elastomer may be any vulcanizable unsaturated hydrocarbon elastomer known to one skilled in the art. These elastomers may include but not be limited to natural rubber (NR), styrene-butadiene rubber (SBR), butadiene rubber (BR), nitrile rubber (NBR), ethylene propylene (EP) or ethylene propylene diene terpolymers (EPDM), 1,4-cis polybutadiene, polychloroprene, 1,4-cis polyisoprene, optionally halogenated or non-halogenated isoprene-isobutene copolymers, butadiene-acrylonitrile, styrene-butadiene-isoprene terpolymers and the like and derivatives and mixtures thereof. The vulcanizable elastomeric formulation may optionally also include one or more other additives or additive mixtures conventionally used in elastomer and rubber processing and vulcanized elastomeric article manufacture. Non-limiting examples of such additives include flow improvers, processing aids, mold lubricants and corrosion inhibitors, tackifiers, homogenizers, antioxidants, antidegradants, antiozonants, anti-fatigue agents, accelerators, extenders and fillers, adhesion promoters, activators, bonding agents, buffers, fillers, pigments, antireversion agents, prevulcanization inhibitors, acid retarders, plasticizers or other compounding ingredients or additives and combinations and mixtures thereof that further enhance the processing characteristics and/or improve the performance of the elastomeric formulation or the elastomeric article from which it is formed. Suitable flow aids, processing aids and lubricants include fatty acids, fatty acid soaps including zinc soaps, fatty acid amides, fatty acid esters and their derivatives, silicon dioxide, pumice, stearate and general rubber processing oils. Suitable fillers and extenders include carbon black, gypsum, kaolin, bentonite, titanium dioxide, silicates of various types, silica, clay, calcium carbonate, and the like.

Suitable accelerators may include, but not be limited to guanidines such as N,N'-di-ortho-tolylguanidine and di-ortho-tolylguanidine salt of dicatechol borate; thiazoles such as 2-mercaptobenzothiazole disulfide, 2-mercaptobenzothiazole and zinc 2-mercaptobenzothiazole; sulfenamides such as N-oxydiethylene-2-benzothiazole sulfenamide, N-oxydiethylene thiocarbamyl-N'oxydiethylene sulfenamide and N-cyclohexyl-2-benzothiazolesulfenamide, N-t-butyl-2-benzothiazolesulfenamide, N-dicylcohexyl-2-benzothiazolesulfenamide; sulfenimides, dithiocarbamates such as bismuth, copper, zinc, selenium or tellurium dimethyldithiocarbamate, zinc diethyldithiocarbamate and zinc dibutyldithiocarbamate; xanthates such as zinc isopropyl xanthanate; thiurams such as tetrabutylthiuram disulfide, tetramethylthiuram monosulfide, dipentamethylenethiuram hexasulfide and tetraethylthiuram disulfide; thioureas such as trimethylthiourea, 1,3-diethylthiourea and 1,3-dibutylthiourea, and combinations and mixtures thereof.

The vulcanizable elastomeric formulations may optionally also include one or more other additives or additive mixtures conventionally used in elastomer and rubber processing and vulcanized elastomeric article manufacture specifically for the purpose of improving processability or the improvement of properties of the vulcanized elastomeric composition. Improvements in processability can be achieved by the addition of retarders, conventionally acidic substances of the traditionally defined Brondsted or Lewis acid types, as one skilled in the art will immediately recognize that these chemicals slow the rate of vulcanization including the time to the onset of scorch and the rate of vulcanization which will allow for additional increased processing temperature and or higher rates of process.

As noted, the present invention relates to the judicious combination of prevulcanization inhibitors in the vulcanizable elastic formulations along with cyclododecasulfur. The use according to the invention of prevulcanization inhibitors, or PVIs, allows reduced levels or elimination of reinforcing resins while providing vulcanizable elastomeric compositions that allow faster processing than previously known compositions, while providing greater durability and consistency in performance over the life of the article.

Prevulcanization inhibitors conventionally allow for higher processing temperatures in order to overcome the problem of premature vulcanization commonly referred to as scorch in the industry. Scorch during processing renders the composition "elastic" and thus no longer plastic and suitable for further processing, shaping, forming or building operations. Suitable prevulcanization inhibitors for use according to the invention include those described, for example, in U.S. Pat. Nos. 3,427,319; 3,473,667; 3,546,185; 3,513,139; 3,562,225; 3,586,696; 3,686,169; 3,752,824; 3,775,428; and 3,904,664; and 3,855,262, the relevant portions of which are incorporated by reference herein.

Thus, PVIs useful according to the invention include those disclosed in U.S. Pat. Nos. 3,427,319, 3,473,667, 3,586,696, and 3,546,185, which disclose classes of sulfenamides that are characterized by the presence of a carbonyl group adjacent to the sulfenamide nitrogen. Other PVIs useful according to the invention are those disclosed in U.S. Pat. No. 3,513,139 which are sulfenamides in which the sulfenamide nitrogen is substituted with at least one alkyl, aryl or alkaryl group. Other PVIs useful according to the invention are those disclosed in U.S. Pat. No. 3,562,225 which are bis-thioimides. Others include those disclosed in U.S. Pat. No. 3,686,169 which are thiocycloamides, those disclosed in U.S. Pat. No. 3,752,824 which are thioamides, those disclosed in U.S. Pat. No. 3,775,428 which are poly(thioamides), those disclosed in U.S. Pat. No. 3,904,664 which are sulfonamides and sulfamides, and those disclosed in U.S. Pat. No. 3,855,262 which are N-hydrocarbylthio (amides). Molecules useful according to the invention which are known to have prevulcanization inhibitor characteristics also include such molecules as polysulfides, or poly-di and tri sulfides, and especially trithioltriazine polysulfides, as disclosed in JPS 58093739 (A).

Compounds useful according to the invention as prevulcanization inhibitors thus include: sulfenamides; sulfonamides; sulfamides; bis-thioimides; thiocycloamides; thioamides; poly(thioamides); N-hydrocarbylthio(amides); polysulfides, including poly-di and tri sulfides, and especially trithioltriazine polysulfides.

Prevulcanization inhibitors are thus agents which improve the processing of rubber and rubber stocks. According to the invention, even relatively small amounts, for instance in the range of 0.1-2.5 phr, depending upon the class of materials, allows materials that can be processed at higher temperatures or for longer times at a given temperature without the initiation of vulcanization reactions. More broadly, PVIs may be used according to the invention in amounts from about 0.01 to about 10 phr, or from 0.02 to 8, or from 0.05 to 5 phr. Vulcanization reactions of elastomeric compositions convert plastic compositions to elastic materials no longer capable of being permanently deformed or shaped by processes which would include extrusion, calendering, injection molding or converted otherwise into useful shapes, dimensions or other configurations useful in the construction of composite elastomeric articles such as tires, hoses, bushings, or other useful rubber articles. Prevulcanization inhibitors thus improve processability, that is delaying the onset of vulcanization reactions, ideally without altering the kinetics or extent of the vulcanization process.

We have surprisingly discovered that the use of PVIs can be useful not only in delaying the onset of vulcanization, but perhaps more importantly, appear to delay the conversion of cyclododecasulfur to soluble sulfur. Highly reinforcing compositions such as hoses, tires, conveyor belts, or other products, employ higher concentrations of sulfur necessarily in the formulations. Even a small amount of conversion of insoluble sulfur to soluble sulfur will create a propensity for bloom. Bloom of course interferes with building of composite rubber articles, consequently any process which reduces the conversion from insoluble sulfur is highly desirable in the industry. We have further discovered that the effect of the PVI on inhibiting the conversion of insoluble sulfur to cyclooctasulfur is unexpectedly improved when the insoluble sulfur is cyclododecasulfur. We have found that processing and inventory management of vulcanizable elastomeric formulations with cyclododecasulfur is improved over compounds containing conventional polymeric sulfur, but the addition of PVI molecules improves the processing even more so.

The vulcanizable elastomeric formulation may optionally be modified with anti-reversion agents and/or retarders or organic acids such as benzoic or salicylic acid modifiers and combinations or mixtures thereof. In one embodiment, the vulcanizable elastomeric formulation includes at least one of an antireversion agent and a prevulcanization inhibitor. Particularly suitable antireversion agents are selected from the group consisting of hexamethylene-1,6-bis(thiosulfate), disodium salt, dihydrate and 1,3-bis(citraconamidomethyl) benzene while a particularly suitable prevulcanization inhibitor is N-(cyclohexylthio)-phthalimide. Anti-reversion agents, such as for example the materials described in U.S. Pat. Nos. 4,605,590 and 5,426,155, improve the physical performance of sulfur vulcanized elastomeric compositions especially in high sulfur loading compositions, high temperature vulcanization conditions and or high temperature application environments. Without question then the combination of the cyclododecasulfur of the present invention with prevulcanization inhibitors and or antireversion agents in a composition or vulcanizable elastomeric formulation of the present invention provides for a wide range of processability while providing for high performance vulcanized articles after vulcanization, vulcanization at higher temperatures, and improved performance in higher temperature environments. Improved performance vulcanized articles may also be formed from vulcanizable elastomeric formulations or vulcanizing compositions that include crosslinkers, for example at least one crosslinker selected from the group consisting of polysulfides or polysulfide mixtures such as but not limited to those described in U.S. Pat. No. 3,979,369 and WO 2014/067940 and or crosslinked organosilicon polysulfides such as but not limited to those disclosed in EP 2 557 083.

Accordingly, a suitable vulcanizable elastomeric formulation includes at least one elastomer; at least one of an antireversion agent, a prevulcanization inhibitor and a retarder; and a vulcanizing agent, wherein the vulcanizing agent comprises a cyclododecasulfur compound. It will thus be understood by one of ordinary skill in the art that the vulcanizing composition may further include any additive which retards the conversion of cyclododecasulfur into cyclooctasulfur, which is thermodynamically more stable under ambient conditions A suitable activator is zinc stearate, preferably formed directly in the composition by adding zinc oxide and stearic acid. Suitable antioxidants include thioesters and amines such as alkylated diphenylamines, para-phenylenediamines available from Eastman Chemical Company under the name Santoflex™; phenols and hydroquinolines and the like. Suitable tackifiers include hydrocarbon resin additives such as those available from Eastman Chemical Company under the name Impera™. A suitable anti-fatigue agent is polymerized 2,2,4-trimethy-1,2-dihydroquinoline (TMQ), commercially available as VULCANOX™. Suitable antiozonants include aniline derivatives, diamines and thioureas. Suitable antidegradants include ultraviolet agents such as substituted benzotriazoles and substituted benzophenones. Suitable pigments and dyes include iron oxide, titanium dioxides, organic dyes, carbon black, zinc oxide and hydrated silicon compounds.

The amounts of the elastomer and the vulcanizing agent cyclododecasulfur compound in the vulcanizable elastomeric formulation of the present invention will vary depending on a number of factors, for example intended processing conditions, concentration of vulcanizing agent in the vulcanizing composition (when such a composition is utilized) and the mechanical and other performance requirements of the resulting elastomeric article. Typically, the amount of vulcanizing agent cyclododecasulfur compound in the vulcanizable elastomeric formulation of the present invention is from 0.25 to 30 weight percent cyclododecasulfur compound based on the total weight of the elastomeric formulation. Accordingly, the vulcanizing composition may be present in the vulcanizable elastomeric formulation in an amount sufficient to supply to the elastomeric formulation from 0.3 to 43 weight percent cyclododecasulfur based on the total weight of the elastomeric formulation when the cyclododecasulfur is present in the vulcanizing composition at about 80 weight percent.

In another aspect, the present invention is directed to a process for making a vulcanizable elastomeric formulation. The process generally includes mixing an elastomer with a vulcanizing agent to form a vulcanizable elastomeric formulation that includes the vulcanizing agent dispersed in an elastomer, wherein the vulcanizing agent includes a cyclododecasulfur compound. Preferably, the cyclododecasulfur compound is characterized by a DSC melt point onset of from about 155° C. to about 167° C., more preferably between 157° C. and 167° C. when measured at a DSC heat rate of 20° C./minute and most preferably between 160° C. and 1670° C. when measured at a DSC heat rate of 20° C./minute. As the vulcanizing agent cyclododecasulfur compound is preferably mixed with the elastomer as component of a vulcanizing composition, the mixing step of the process preferably includes the step of combining a vulcanizing composition with an elastomer to form a vulcanizable elastomeric formulation, wherein the vulcanizing composition includes a vulcanizing agent that includes a cyclododecasulfur compound.

In another aspect, the present invention is directed to a process for forming a vulcanized elastomeric article. This process generally includes the process steps described above for making a vulcanizable elastomeric formulation followed by forming the vulcanizable elastomeric formulation into a formed shape and vulcanizing the formed shape to form a vulcanized elastomeric article. Accordingly, in one embodiment, the process includes a) mixing an elastomer with a vulcanizing agent to form a vulcanizable elastomeric formulation that includes the vulcanizing agent dispersed in the elastomer, wherein the vulcanizing agent includes a cyclododecasulfur compound; b) forming the vulcanizable elastomeric formulation into a formed shape; and c) vulcanizing the formed shape to form a vulcanized elastomeric article. The step of "forming" the vulcanizable elastomeric formulation as used herein typically includes one or more steps, such as for example mixing, calendering, extruding and other processing, shaping or forming steps, often applied to a vulcanizable elastomeric formulation by vulcanized article manufacturers during the manufacture of elastomeric articles such as tires and tire components. One of ordinary skill will appreciate that, to the extent optional ingredients or materials such as for example the antireversion agents, prevulcanization inhibitors, crosslinkers and accelerators described herein, are desired in conjunction with the process of the present invention, they may be added to the vulcanizable elastomeric formulation as a component of the vulcanizing composition or simply added during the mixing step.

As the vulcanizing agent cyclododecasulfur compound of the vulcanizing composition of the present invention exhibits improved thermal stability over prior art sulfur vulcanizing agents, an important aspect of the present invention is that the temperatures utilized in processes for forming vulcanizable elastomeric formulations, as well as the temperatures such formulations are subjected to in the manufacture of vulcanized elastomeric articles employing such formulations, can with the present invention readily exceed the temperature limits imposed by the thermal stability characteristics of prior art vulcanizing agents. In one embodiment, therefore, at least one of the mixing and forming steps in the present process for forming a vulcanized elastomeric article may include increasing the bulk average processing temperature of the vulcanizable elastomeric formulation to greater than 125° C., preferably greater than 128° C., more preferably greater than 130° C., even more preferably greater than 135° C., for at least a portion of the step. Accordingly, the bulk average processing temperature of the vulcanizable elastomeric formulation during at least one of the mixing and forming steps is greater than 125° C., preferably greater than 128° C., more preferably greater than 130° C., even more preferably greater than 135° C. for at least a portion of the forming step. As an element of this aspect, the present invention also includes a vulcanized article formed from the vulcanized formulation of the present invention, more preferably a vulcanized elastomeric article formed from the vulcanized elastomeric formulation of the present invention.

Those skilled in the art will readily appreciate, in view of the present disclosure, that even higher temperatures than those cited herein may be used for short periods of time, the limitation being the entire time-temperature history or "thermal budget" of the entire process. One can therefore afford longer times at lower temperatures and even higher temperatures for relatively shorter periods of time.

In another embodiment, the process includes (a) mixing an elastomer with a vulcanizing agent to form a vulcanizable elastomeric formulation that includes the vulcanizing agent dispersed in the elastomer; (b) forming the vulcanizable elastomeric formulation into a formed shape; and (c) vulcanizing the formed shape to form said vulcanized elastomeric article; wherein the at least one of the mixing and forming steps includes increasing the bulk average processing temperature of the vulcanizable elastomeric formulation to greater than 125° C., preferably greater than 128° C., more preferably greater than 130° C., even more preferably greater than 135° C., for at least a portion of that step. In this embodiment, the vulcanizing agent preferably includes a cyclododecasulfur compound, more preferably a cyclododecasulfur compound characterized by a DSC melt point onset of from about 155° C. to about 167° C. when measured at a DSC heat rate of 20° C./minute.

In the above description of the processes of the present invention, "bulk average processing temperature" is chosen as a temperature measurement parameter in view of the common practice in commercial vulcanized elastomeric article manufacture to employ a set of thermocouples to measure temperature during mixing and forming steps. These thermocouples provide a limited number of temperature data points (correlating to the number of thermocouples) as to the temperature of the formulation at certain locations within the formulation mass as it proceeds through the process steps. The "bulk average processing temperature" is therefore meant to mean the arithmetic average of a reasonable number (reasonable being greater than 1) of temperature measurements of the elastomeric formulation mass taken during at least one of the mixing and forming steps.

One of ordinary skill in the art will appreciate, however, that other temperature measurement techniques may be or may become available that allow for a more thorough temperature analysis of the elastomeric formulation mass. By way of non-limiting example, thermal imaging may be utilized to measure the bulk average processing temperature of a formulation mass. In thermal imaging techniques, each pixel essentially functions as a discrete thermometer; therefore, such techniques can provide more comprehensive localized data regarding the formulation, especially when high resolution thermal imaging is utilized. Such techniques may allow measurement of hundreds, or even thousands, of points on a formulation mass that may simply be averaged in order to obtain a bulk average processing temperature of the formulation. Those skilled in the art will readily appreciate that a more meaningful measurement will be obtained with thermal imaging in cases where the formulation is being actively manipulated so that interior portions of the formulation mass that may be at an elevated temperature are quickly brought to the surface at the time the thermal measurement is taken. If thermal imaging is instead used on a formulation mass that has been at rest for an extended period, the external portion of the formulation will have cooled with respect to the interior portions of the mass such that an artificially low bulk average processing temperature measurement will be obtained.

The "bulk average processing temperature" as used herein should be distinguished from "point processing temperatures" taken in isolation, that is, a temperature at a measurable point in the elastomeric formulation mass during at least one of the mixing and forming steps that is not representative of the overall temperature, or bulk average processing temperature, of the formulation mass, and in fact may be substantially higher than the bulk average processing temperature of the formulation mass. Accordingly, in another embodiment of the process of the present invention for forming a vulcanized elastomeric article, at least one of the mixing and forming steps includes increasing a point processing temperature of the vulcanizable elastomeric formulation to greater than 135° C., preferably greater than 140° C., more preferably greater than 150° C., even more preferably greater than 160° C., and even more preferably greater than 165° C., for at least a portion of that step.

One of ordinary skill in the art will recognize that another benefit of the present invention, most evident from the elevated process temperature aspects thereof, is that the portfolio of optional additives available for use in the compositions, formulations and processes of the present invention may be different from those used with conventional vulcanizing agents. For example, additives that may not be sufficiently active at lower processing temperatures may be used with the vulcanizing agents of the present invention. Such additives may include for example cross-linkers based on polysulfides as discussed above and non-amine containing accelerators such as for example at least one accelerator selected from the group consisting of 2-mercaptobenzothiazole, 2-mercaptobenzothiazole disulfide and asymmetric disulfides based on 2-mercaptobenzothiazole and a non-accelerating mercapto containing moiety such as 2-(cyclohexyldisulfaneyl)benzothiazole.

Conversely, additives that may be effective at conventional processing temperatures may be too active, unstable or materially less effective at the elevated temperatures of the present invention. In such a scenario, suitably active and stable materials such as those antireversion agents, prevulcanization inhibitors, polysulfidic crosslinking agents and other classes of materials described herein should be preferentially utilized.

A further aspect of the present invention is that the elevated processing temperatures enabled by cyclododecasulfur may reduce or eliminate the need for the use of resin replacements, such as for example the bonding or hardening resins described below, in rubber formulations. In practice, practical upper limits exist for the use of conventional insoluble sulfur since it is quite difficult to carry out such processes without even a small amount of conversion of the insoluble sulfur to cyclooctasulfur, resulting in unwanted bloom. So, for example in many formulations, even if only 10% of conventional insoluble sulfur reverts, then loadings of about 6-7 wt. % may yield cyclooctasulfur concentrations at or above the threshold for bloom, even at conventional processing temperatures.

Compounders therefore frequently employ hardening or bonding resins to achieve a higher modulus in cases where the amount of insoluble sulfur needed would otherwise exceed the threshold for bloom. These resins are typically based on resorcinol, phenol, cashew nut oil or other similar materials reacted with formaldehyde or formaldehyde donors such as hexamethylene tetramine or hexamethoxymethylol melamine. These resins allow a higher modulus to be achieved, but contribute additional complications to the elastomeric vulcanizable formulations. The resins have low inherent solubility in general purpose elastomers and thus may themselves be a source of bloom. These resins also contribute processing complications, as their presence increases the vulcanizable elastomeric composition viscosity which limits practical processing speeds and temperatures.

Further, the vulcanizates prepared using these bonding or hardening resins are inferior to a high sulfur composition of similar modulus. Bonding and hardening resin formulations suffer from irreversible strain-dependent softening. That is to say, when these articles are subjected to increasing strains, the network formed by the bonding hardening resin will be permanently disrupted leading to a softer more hysteretic article. High modulus compositions prepared from sulfur and sulfur containing vulcanizing agents produce a more durable, more strain independent product. One skilled in the art will recognize that higher modulus, less strain-dependent components which exhibit lower hysteresis are particularly suitable for use in large off-the-road tires such as those used in earthmoving vehicles and construction or excavating equipment and particularly useful in the transportation industry for use in light, medium or heavy trucks and passenger tires. More importantly, preparing more durable components is instrumental in the light-weighting of tires and manufacturing of run-flat designed tires. Reducing strain softening of tires used in earth moving or in mining operations is highly desirable as improving this feature will immediately make construction and mining operations more profitable. This is so important that many tires used in such industries have "ton-mile-per hour" ratings.

According to the invention, the outstanding thermal stability of the cyclododecasulfur of the present invention allows for processing of rubber compositions at higher temperatures with less bloom. Hence, formulations of natural rubber, butadiene rubber, styrene-co-butadiene or other general purpose elastomers, as already described, with from 10 to 40 phr of cyclododecasulfur are practical for modern factory processing, and may thus reduce or eliminate the need for resin replacements. One skilled in the art will readily recognize that these elevated levels of sulfur in elastomeric compositions characterize "ebonite" and like materials.

In another aspect, the present invention is directed to a vulcanizing agent masterbatch. A vulcanizing agent masterbatch, also known as a concentrate, is a combination of ingredients purposefully formed at elevated active ingredient (e.g. vulcanizing agent) concentrations in an appropriate elastomeric carrier such that, when subsequently combined with or "let down" into an elastomer, a final vulcanizable elastomeric formulation having the desired final active ingredient concentrations is formed. The vulcanizing agent masterbatch of the present invention includes (i) a vulcanizing agent in the amount of from 40 to 90 weight percent of based on the total weight of the masterbatch and (ii) an elastomeric carrier, wherein the vulcanizing agent includes a cyclododecasulfur compound. Preferably, the cyclododecasulfur compound is characterized by a DSC melt point onset of from about 155° C. to about 1670° C. when measured at a DSC heat rate of 20° C./minute.

Examples of suitable elastomeric carriers are the elastomers listed above as suitable for the vulcanizable elastomeric formulation of the present invention and may include but not be limited to natural rubber or any synthetic rubber, such as natural rubber (NR), styrene-butadiene rubber (SBR), butadiene rubber (BR), nitrile rubber (NBR), ethylene propylene (EP) or ethylene propylene diene monomer (EPDM), and the like. Preferably, the elastomeric carrier is selected to match or be compatible with the elastomer with which the masterbatch is combined when forming a final vulcanizable elastomeric formulation having the desired final active ingredient concentrations. The vulcanizing agent masterbatch may optionally also include other additives conventionally used in rubber processing and vulcanized article manufacture as listed above as optional for the vulcanizable elastomeric formulation of the present invention, including flow/processing aids, antioxidants, antidegradants, fatty acids, zinc oxide, accelerators, extenders, adhesion promoters, activators, bonding agents, buffers, fillers, pigments, anti-reversion agents, prevulcanization inhibitors, acid retarders, plasticizers or other compounding ingredients or additives to further enhance the characteristics and/or improve the performance of the elastomeric formulation or the elastomeric article from which it is formed.

The present invention is also directed to a cyclododecasulfur compound characterized by a DSC melt point onset of from about 155° C. to about 167° C. when measured at a DSC heat rate of 20° C./minute. More preferably the DSC melt point onset is between 157° C. and 1670° C. when measured at a DSC heat rate of 20° C./minute and most preferably the DSC melt point onset is between 160° C. and 1670° C. when measured at a DSC heat rate of 20° C./minute. An important aspect of the cyclododecasulfur compounds of the present invention is that they have unexpectedly been found to exhibit an elevated melting point relative to known forms of cyclododecasulfur and therefore have been surprisingly identified as a particularly suitable vulcanizing agent for the vulcanizing composition of the present invention.

The cyclododecasulfur compounds of the present invention preferably exhibit other physical features desirable when the cyclododecasulfur is used as a vulcanizing agent in a vulcanizing composition. For example, the cyclododecasulfur compounds of the present invention are preferably in particle form with a specific surface area of no more than 50 $m^2/g$, preferably a specific surface area of no more than 25 $m^2/g$, more preferably a specific surface area of no more than 10 $m^2/g$, even more preferably a specific surface area of no more than 5 $m^2/g$ and most preferably a specific surface area of no more than 2 $m^2/g$ as measured according to the BET method. Further, the cyclododecasulfur compounds of the present invention are preferably in particle form with a median particle diameter of 0.1 to 1200 microns, more preferably 0.5 to 300 microns, most preferably 10 to 100 microns. Further, the cyclododecasulfur compounds of the present invention are preferably in particle form with a polydispersity ratio of no more than 15, more preferably a polydispersity ratio of no more than 10 and most preferably a polydispersity ratio of no more than 8.

The specific surface area, also known as the "BET" area, is a well-known measurement wherein specific surface area of a particulate material or powder is determined by physical adsorption of a gas on the surface of the solid and by calculating the amount of adsorbate gas corresponding to a multi-layer on the surface based on the Brunauer, Emmett and Teller (BET) adsorption isotherm equation. The median particle diameter, sometimes referred to as "D50", is a parameter typically used in the art to give a general indication as to the coarseness of a material. The polydispersity ratio, also referred to as "D90/D10", is a parameter that functions as an indication of the uniformity of the distribution of particle sizes. D90 is the diameter at which 90% of a sample's mass is comprised of smaller particles while D10 is the diameter at which 10% of a sample's mass is comprised of smaller particles. Accordingly, D90/D10 is the ratio of these two values.

Equipment and methods for determining particle diameters as required for D50 and D90/D10 measurements are well known in the art and commercially available, for example: Malvern (Mastersizer series), Horiba (LA series), Sympatec (Helos series) and Shimadzu (SALD series). Methods for determining the Nitrogen adsorption isotherm in conjunction with determining specific surface area, such as ASTM-D1993-03 (2013), are well known in the art. Further, equipment for determining the Nitrogen adsorption isotherm are well known and commercially available, for example from Micromeritics (Tristar II series) and Quantachrome (Nova series).

In general, the cyclododecasulfur compounds of the present invention are synthesized according to a process that includes (i) reacting cyclooctasulfur, tetramethylethylenediamine and zinc to form a tetramethylethylenediamine/$ZnS_6$ complex; and (ii) reacting said complex with an oxidizing agent under exothermic reaction conditions to form a cyclododecasulfur-containing reaction mixture that may include one or more unreacted reactants, by-products and impurities. Suitable oxidizing agents include without limitation bromine, chlorine, and thiocyanogen. Preferably, the process further includes isolating cyclododecasulfur from the cyclododecasulfur-containing reaction mixture. A suitable technique for the isolating step includes for example dissolving and recrystallizing the cyclododecasulfur from the cyclododecasulfur-containing reaction mixture, preferably using solvents selected from the group consisting of $CS_2$ and aromatic solvents.

The following examples, while provided to illustrate with specificity and detail the many aspects and advantages of the present invention, are not be interpreted as in any way limiting its scope. Variations, modifications and adaptations which do depart of the spirit of the present invention will be readily appreciated by one of ordinary skill in the art.

ANALYTICAL METHODS

Differential Scanning Calorimetry (DSC)—

The differential scanning calorimetry method (DSC) to measure the melt point onset and melting point range of the cyclododecasulfur compound involves a first heating scan, from which are determined the melting peak temperature (Tm1) and the exothermic peak temperature (Tex1). The instrument used was a TA's Q2000 DSC (RCS) with a refrigerated cooling system. The procedure used is described herein as follows. The instrument was calibrated according to the manufacturers "User's Manual"; by setting the onset of the melting point of adamantane, indium and lead at −65.54° C., 156.60° C. and 327.47° C., respectively, and heat of fusion of indium at 6.8 cal/g. A calibration specimen of about 3.0 mg was then scanned at a rate of 20° C./min. in the presence of helium with a flow rate of 50 cc/min. For sulfur-containing specimens, a similar method was used. A TA's Tzero aluminum pan and lid along with two aluminum hermetic lids were tared on a balance. About 3.0 mg of the sulfur-containing specimen was weighed into the Tzero pan, covered with the tared lid, and crimped using a TA's sample crimper with a pair of "Black" dies. The crimped specimen from the "Black" die stand was moved to the "Blue" die stand, where two tared hermetic lids were placed on the top of the specimen pan and crimped with the top "Blue" die. An empty crimped Tzero aluminum pan and lid along with 2 hermetic lids was prepared in a similar fashion as reference. The specimen and reference pans were placed in the DSC tray and cell at room temperature. After the DSC was cooled to −5° C. using a refrigerated cooling system, the specimen was heated from −5 to 200° C. at a rate of 20° C./min in the presence of helium. "DSC melt point onset" is defined as the temperature at the start of the endothermic melting event. Data analysis was performed using TA's software, Universal V4.7A, wherein, Tm1 refers to the low melting peak temperature occurring on the melting curve, using analysis option, "Signal Maximum". Tex1 refers to the exothermic peak temperature occurring right after Tm1, using analysis option, "Signal Maximum".

UniQuant (UQ)—

Samples were also analyzed using X-ray fluorescence and the UniQuant software package. UniQuant (UQ) is an x-ray fluorescence (XRF) analysis tool that affords standardless XRF analysis of samples. Samples can then be semi-quantitatively analyzed for up to 72 elements beginning with row three in the periodic table (i.e. Na to higher Z). The data are mathematically corrected for matrix differences between calibration standards and samples as well as absorption and enhancement effects; i.e. inter-element effects. Some factors that can affect the quality of results include granularity in the sample (leading to shadow effects), mineralogical effects (due to sample inhomogeneity), insufficient sample size, and lack of knowledge of the sample matrix. In cases where a sample was amenable to both XRF UQ analysis and ICP-OES (i.e. quantitative) analysis generally agree within +/−10%. Samples were analyzed for Zn, Br, Cl, and S content by UQ.

NMR—

Weigh approximately 0.0200 g of sample into a vial. Weigh approximately 0.0200 g of the internal standard, 1,4-dimethoxybenzene, into the same vial. Add approximately 1 mL of pyridine-d5, or other deuterated solvent that the material is soluble in. Take a $^1$H NMR of the material and integrate the peak at δ 3.68 (6 protons). Integrate the two peaks at δ 2.45 and δ 2.25 (16 protons). Calculate the % purity using the following equation.

% Purity=100[(mg IS/MW IS)*(∫sample/∫IS)*(6/16)* (MW sample/mg sample)]

IS=internal standard
MW=molecular weight
∫=value of the integration from the $^1$H NMR Raman Spectroscopy—

Raman spectrum was measured using a Renishaw inVia confocal Raman microscope and WiRE 4.1 software with a 785 nm excitation laser and a 5× magnification microscope objective.

Example 1—Preparation of (TMEDA)ZnS$_6$ Complex

Tetramethylethylenediamine (TMEDA), (408 grams) and methanol (72 grams) were added to a 3 L, 3-neck glass flask equipped with a mechanical stirrer (reaching closely to the vessel walls), thermocouple, $N_2$ bubbler, water condenser, and electrical heating mantle. The system was purged with nitrogen and the temperature of the mixture adjusted to 35° C. Freshly ground cyclooctasulfur (powder) was added over five minutes while maintaining stirring at 425-450 rpm. The temperature was increased to 45° C., whereupon 40 grams of metallic zinc powder (<10 micron particle size, >98% purity) was added over five minutes while maintaining stirring at 425-450 rpm. The gray-greenish yellow reactor contents were then heated slowly to 86° C. and agitated for 4 hours, or until yellow. Once yellow, the mixture was held for an additional two hours at temperature, with agitation. At the end of the reaction time, the flask was cooled to room temperature, the agitator turned off, and free liquid removed by vacuum extraction. Methanol (600 ml) was added to the flask to create a slurry, and agitated for one hour. The resulting slurry was then filtered on a vacuum Buchner filter (1 micron paper) and washed with two portions of 200 ml each of methanol. The solids were removed from the filter and dried overnight in a vacuum oven set at 50° C. and 0.1 MPa. Yield was close to quantitative, with 233 grams of (TMEDA) ZnS$_6$ complex, 97.5% purity by NMR analysis per the above procedure.

Example 2—Preparation of Cyclododecasufur of Present Invention (S$_{12}$) from (TMEDA)ZnS$_6$ Complex Methylene chloride (750 mL) was added to a 2 L, 4-neck glass flask equipped with a mechanical stirrer, thermocouple, $N_2$ bubbler and stopper. Bromine (16.7 g, 104.5 mmol, 1.0 eq) was weighed into a bottle containing 50 mL $CH_2Cl_2$ and this mixture was added to the flask. The solution was cooled to 4° C. The zinc complex, (TMEDA)ZnS$_6$, from Example 1, (97.5% pure) (40 g, 104.3 mmol, 1.0 eq), was added all at once and washed in with 50 mL $CH_2Cl_2$. There was an immediate exotherm to 11° C. The solution was stirred for 15 minutes, filtered, washed with cold $CH_2Cl_2$ and suctioned dry. The solids were slurried in THF (250 mL), filtered and suctioned dry. The resultant solids were slurried in cold $CS_2$ (155 mL), filtered and suctioned dry to afford 10.2 g of a pale yellow solid. (yield 50.8% based on sulfur in the zinc complex). Evaluation using the UQ elemental analysis method described above showed the material to be 96.6% sulfur (all cyclododecasulfur ($S_{12}$) and sulfur polymer by Raman spectroscopy), 2.67% zinc and 0.7% bromine.

The cyclododecasulfur was further purified in a two-vessel system comprising an upper 2 L, jacketed 3-neck glass flask equipped with a mechanical stirrer, fine glass fritted filter plate, thermocouple, $N_2$ bubbler, dry ice trap, and bottom valve; and a lower 2 L, jacketed 3-neck glass flask equipped with a mechanical stirrer, water-cooled condenser and 1 L glass receiver pot, thermocouple, $N_2$ bubbler, dry ice trap, and bottom valve. To initiate the purification procedure, carbon disulfide (1200 grams) was added the upper vessel along with the cyclododecasulfur from the above reaction step (10.2 g). The contents of the flask were heated to 40-42° C. with stirring. After agitation of the mixture for half of an hour, the bottom valve of the vessel was opened, and the free liquid pulled through the fritted glass filter into the lower flask. About half of the initial solids remained on the filter. The solution in the second vessel was cooled to −6° C. over a period of 20 minutes or less. During the cooling phase, fine light yellow crystalline cyclododecasulfur formed. The solution was stirred for about 15 minutes at a final temperature of −6° C., whereupon the bottom valve of the vessel was opened and the slurry of $S_{12}$—$CS_2$ was dropped onto a Buchner funnel fitted with 2 micron filter paper. The light yellow crystalline cyclododecasulfur was suctioned dry and scraped from the filter paper. The mother liquor from the final filtration was returned to the upper vessel, (containing residual solids), along with makeup $CS_2$ to give 1200 grams of liquid. The upper vessel was agitated and heated again to 40-42° C. and the filtering-cooling procedure was repeated to recover a second crop of purified cyclododecasulfur ($S_{12}$) crystals. After the final heating-dissolution step, about 0.26 grams of greenish-yellow solids remained on the upper fritted filter. The combined wet $S_{12}$ crystals were placed in a vacuum oven overnight at 30° C. and about 0.01 MPa to remove residual $CS_2$, to give 9.3 grams of dried, purified cyclododecasulfur. Evaluation by the UQ elemental method described above showed the material to be at least 99.9% sulfur (all $S_{12}$ by Raman), and less than 100 ppm of zinc and bromine. The melting point was determined first by DSC and then using a thermal resistance melting point apparatus to be 162° C. and 157° C. respectively. Overall yield of sulfur to $S_{12}$ was 46%.

Example 3—Comparison of Melting Points of Cyclododecasulfur Materials

Several batches of purified cyclododecasulfur of the present invention were prepared following the procedures exemplified by Examples 1 and 2. Each final purified material was analyzed by Raman, Uniquat® or ICP, and melt point onset measured using DSC as described above. The results are set forth in Table 1 below along with "control" cyclododecasulfur melt points extrapolated from reported data measured at a DSC heat rate of 10° C./min, 5° C./min and 2.5° C./min in Steudel, R.; Eckert, B., "Solid Sulfur Allotropes", Topics in Current Chemistry (2003).

TABLE 1

| Sample | Melting point, ° C. |
|---|---|
| Invention Batch 1 | 166.0 |
| Invention Batch 2 | 156.0 |
| Invention Batch 3 | 159.3 |
| Invention Batch 4 | 158.6 |
| Invention Batch 5 | 162.4 |
| Invention Batch 6 | 164.0 |
| Invention Batch 7 | 161.5 |
| Control | 153.5 |

As shown above, the cyclododecasulfur compound of the present invention exhibits a melt point onset materially and unexpectedly higher than prior art cyclododecasulfur compounds. Observed variations in melt point for the present invention were expected due to degree of impurities in the samples as detected by Raman.

As noted above, thermal stability (or resistance to thermal degradation or reversion to soluble sulfur) is an important parameter in selecting a suitable vulcanizing agent. The thermal stability performance of the present invention in mixing was demonstrated in this example 3 by mixing a previously formed composition set forth in Table 2 below with either 5.0 phr of commercially available polymeric sulfur (as 6.25 g Crystex® HD OT20 available from Eastman Chemical Company) to form control vulcanizable elastomeric formulations or 5.00 phr of the cyclododecasulfur of the present invention to form vulcanizable elastomeric formulations of the present invention. One (1.0) phr of a conventional vulcanization accelerator, N,N'-Dicyclohexyl-2-mercaptobenzothiazole sulfenamide (DCBS), was also added to each vulcanizable elastomeric formulation. Mixing was performed using a Kobelco 1.6 L laboratory mixer equipped with 4 wing H rotors. Formulations and discharge temperatures for the six sample items created per the above procedure are set forth below in Table 3.

TABLE 2

| Component | phr |
|---|---|
| Natural Rubber TSR-10 | 100 |
| N-339 Carbon Black | 50 |
| Zinc Oxide | 8 |
| Stearic Acid | 2 |
| N1-(4-methylpentan-2-yl)-N4-phenylbenzene-1,4-diamine (6-PPD) | 2 |
| Total | 162 |

TABLE 3

| | Item number | | | | | |
|---|---|---|---|---|---|---|
| | 1 | 2 | 3 | 4 | 5 | 6 |
| Table I Masterbatch (phr) | 162 | 162 | 162 | 162 | 162 | 162 |
| DCBS (phr) | 1 | 1 | 1 | 1 | 1 | 1 |
| Polymeric Sulfur (phr) | | 6.25 | 6.25 | 6.25 | | |
| Cyclododecasulfur (phr) | 5.00 | | | | 5.00 | 5.00 |
| Total | 168.00 | 169.25 | 169.25 | 169.25 | 168.00 | 168.00 |
| Target Rubber discharge Temperature (° C.) | 140 | 150 | 130 | 140 | 150 | 130 |

For each sample item, the sample was discharged from the mixer and sheeted on a two roll mill equilibrated to 70° C. The rubber content of each sample was then extracted with dioxane and the soluble sulfur content of each item determined by HPLC (Agilent 1260 high performance liquid chromatography). Target temperatures, actual rubber temperature after discharge and cyclooctasulfur content reported as a percentage of initial sulfur material, is given below in Table 4.

TABLE 4

| | Item number | | | | | |
|---|---|---|---|---|---|---|
| | 1 | 2 | 3 | 4 | 5 | 6 |
| Target Temperature (° C.) | 140 | 150 | 130 | 140 | 150 | 130 |
| Discharged Rubber Temperature(° C.) | 139 | 151 | 131 | 137 | 146 | 131 |
| % cyclooctasulfur Recovered | 15.12 | 97.04 | 38.69 | 91.34 | 49.80 | 7.91 |

As demonstrated by the above, the cyclododecasulfur of the present invention exhibits markedly reduced reversion to cyclooctasulfur (and therefore improved thermal stability in rubber mixing processes) when compared to current commercially available polymeric sulfur vulcanizing agents. Further examples below also describe formation of vulcanizable elastomeric formulations of the present invention that are then subsequently tested for thermal stability/bloom resistance and also evaluated to demonstrate the efficacy of the compound of the present invention as a vulcanizing agent.

Example 4—Forming Vulcanizable Elastomeric Formulations that Include the Cyclododecasulfur Compound of the Present Invention As a first step, a precursor composition P-1 of conventional materials used in the manufacture of elastomeric articles was prepared by combining the following ingredients:

TABLE 5

| Composition P-1 | |
|---|---|
| Ingredient | Amount (phr) |
| Natural Rubber | 100 |
| Carbon Black | 50 |
| ZnO | 8 |
| Stearic Acid | 2 |
| 6PPD | 2 |

A vulcanizable elastomeric formulation of the present invention (Sample A-1) was then prepared as follows:

TABLE 6

| A-1 | |
|---|---|
| Ingredient | Weight (gms) |
| P-1 | 81 |
| DCBS | 0.5 |
| Cyclododecasulfur | 2.5 |

For comparison, control vulcanizable elastomeric formulations C-1 and C-2, were also prepared by substituting the cyclododecasulfur of the present invention in the composition described above with polymeric sulfur (for C-1) and cyclooctasulfur (rhombic or soluble) sulfur (C-2) as follows:

TABLE 7

| C-1 | |
|---|---|
| Ingredient | Weight (gms) |
| P-1 | 81 |
| DCBS (vulcanization accelerator) | 0.5 |

TABLE 7-continued

| C-1 | |
|---|---|
| Ingredient | Weight (gms) |
| Polymeric sulfur (in the form of 3.13 g Crystex ® HD OD20 commercially available from Eastman Chemical Company) | 2.5 |

TABLE 8

| C-2 | |
|---|---|
| Ingredient | Weight (gms) |
| P-1 | 81 |
| DCBS (vulcanizing accelerator) | 0.5 |
| Cyclooctasulfur (S8) | 2.5 |

In forming each of A-1, C-1 and C-2, a Brabender mixer was preheated to 80° C. then P-1 was loaded into the mixer and mixed at @ 50 rpm for 30 seconds. Mixer speed was then reduced to 35 rpm; the sulfur ingredient and accelerator added; and the resulting composition mixed at 35 rpm for an additional 90 seconds. The material was then discharged from the mixer, its temperature recorded and sheeted on a 80° C. mill.

Example 5—Thermal Stability Testing

The vulcanizable elastomeric formulations A-1 and C-1 above were placed in a preheated to about 88° C. Brabender internal mixer with the rotor speed initially set to 35 rpm. The rubber was mixed and the rotor speed was adjusted, faster or slower, such that the rubber mixture in the mixer was maintained at 125° C. for extended times to simulate possible commercial plant processing conditions such as extrusion or calendering operations. Samples were extracted from the mixer at various times as indicated in Table 9 below and the weight percent cyclooctasulfur (as the product of degradation/reversion of both polymeric sulfur and the cyclododecasulfur of the present invention) of the sample was measured using the method for cyclooctasulfur measurement described in Example 3 above. The results for weight percent cyclooctasulfur are shown in the following table 9:

TABLE 9

| | Wt % cyclooctasulfur in extended rubber mixes | | | | |
|---|---|---|---|---|---|
| Time | 2 min | 4 min | 6 min | 8 min | 10 min |
| A-1 | 0.2 | 0.49 | 0.95 | 1.525 | 2.15 |
| C-1 | 2.15 | 2.45 | 2.7 | 2.8 | 2.85 |

At the 125° C. processing temperatures of Table 9 above, polymeric sulfur has already exceeded the bloom threshold level by almost 3× when the first sample is taken at two minutes whereas the cyclododecasulfur of the present invention may be processed on the order of 5 minutes at 125° C. before reaching the threshold bloom level. This unexpected advantage is particularly critical as many commercial factory process steps are completed in less than two minutes and often less than one minute at higher temperatures in order to maximize throughput, efficiency and production volume.

Example 6—Vulcanization Efficacy

Multiple samples of vulcanizable elastomeric formulation A-1, C-1 and C-2 were separately vulcanized at 130, 140, 155, 160, 167, and 180° C. using the Alpha Technologies Moving Die Rheometer, with four parameters related to vulcanization rates and efficiencies (Maximum Torque, Scorch Time, $t_{90}$ and Maximum rate of vulcanization) measured during the vulcanization process. Maximum Torque (MH) is a measure of the formed network density with increases in modulus directly related to increases in crosslink density. Scorch Time ($ts_2$), also known as onset of cure, is defined as the time required for the system to show a torque increase of 2 dNm above the minimum measured torque. $T_{90}$ is the time required to reach 90% state of cure. Maximum rate of vulcanization (Rh) is a measure of the fastest rate of vulcanization observed during the curing cycle. The results from testing these four parameters are set forth in Tables 10 through 13 below.

TABLE 10

| | Cure Property MH | | |
|---|---|---|---|
| Cure Temperature, ° C. | C-1 in dNM | A-1 | C-2 |
| 130 | 26.8 | 27.4 | 27.8 |
| 140 | 25.4 | 26.2 | 26.4 |
| 155 | 23.8 | 24.6 | 24.7 |
| 160 | 22.3 | 23.1 | 23.1 |
| 167 | 21.0 | 21.8 | 21.9 |
| 180 | 20.0 | 20.7 | 20.8 |

TABLE 11

| | Cure Property ts2 | | |
|---|---|---|---|
| Cure Temperature C. | C-1 in Minutes | A-1 | C-2 |
| 130 | 22.1 | 22.1 | 22.2 |
| 140 | 9.1 | 9.5 | 9.6 |
| 155 | 3.9 | 4.2 | 4.1 |
| 160 | 1.7 | 1.9 | 1.8 |
| 167 | 0.8 | 0.9 | 0.9 |
| 180 | 0.5 | 0.5 | 0.5 |

TABLE 12

| | Cure Property t90 | | |
|---|---|---|---|
| Cure Temperature C. | C-1 in Minutes | A-1 | C-2 |
| 130 | 80.4 | 80.1 | 80.8 |
| 140 | 37.9 | 37.9 | 38.7 |
| 155 | 18.0 | 18.2 | 18.4 |
| 160 | 8.7 | 8.8 | 8.9 |
| 167 | 4.3 | 4.4 | 4.4 |
| 180 | 2.3 | 2.3 | 2.3 |

TABLE 13

| | Cure Property Rh | | |
|---|---|---|---|
| Cure Temperature C. | C-1 dNM/minute | A-1 | C-2 |
| 130 | 0.6 | 0.6 | 0.6 |
| 140 | 1.1 | 1.1 | 1.1 |
| 155 | 1.9 | 2.0 | 2.0 |
| 160 | 3.4 | 3.6 | 3.6 |
| 167 | 6.1 | 6.5 | 6.4 |
| 180 | 11.1 | 11.6 | 11.6 |

The data in tables 10-13 indicate that cyclododecasulfur compound of the present invention is an effective and efficient sulfur vulcanization agent.

Example 7. Preparation of Rubber Compounds

Five stocks of belt skim compounds were prepared according to the compositions shown in Table 14. Penacolite® Resin B-19-SC is a resorcinol-formaldehyde-resorcinol polymer resin manufactured by Sumitomo Chemical; HMMM (hexamethoxymethyl melamine) is Resimene 3520 S-72 made by INEOS Melamines LLC., with 72 wt. % active resin absorbed on silica; the cobalt neodecanoate is supplied at 20.5% Cobalt content comprising of two anions of Neodecanoic acid bound to a Cobalt molecule; DCBS is the vulcanization accelerator N,N-Dicyclohexyl-2-benzothiazolesulfenamide; C—S12 is the cyclododecasulfur containing 2% of naphthenic oil.

TABLE 14

| Formulations used for preparing the rubber compounds | | | | | |
|---|---|---|---|---|---|
| Stock | 1 | 2 | 3 | 4 | 5 |
| Natural Rubber | 100.00 | 100.00 | 100.00 | 100.00 | 100.00 |
| HAF Black (N330) | 55.00 | 55.00 | 55.00 | 55.00 | 55.00 |
| Naphthenic oil | 6.00 | 6.00 | 6.00 | 6.00 | 6.00 |
| Stearic Acid | 1.00 | 1.00 | 1.00 | 1.00 | 1.00 |
| Zinc Oxide | 7.00 | 7.00 | 7.00 | 7.00 | 7.00 |
| 6PPD | 2.00 | 2.00 | 2.00 | 2.00 | 2.00 |
| Cobalt Neodecanoate | 1.00 | 1.00 | 1.00 | 1.00 | 1.00 |
| Penacolite B-19SC resin | 3.00 | 0.75 | 0.75 | 0.00 | 0.00 |
| DCBS | 0.70 | 1.08 | 2.50 | 1.08 | 2.50 |
| C-S12 (98%) | 4.08 | 6.12 | 10.20 | 6.12 | 10.20 |
| HMMM S72 (72%) | 4.17 | 0.19 | 0.19 | 0.00 | 0.00 |
| Total | 183.95 | 180.15 | 185.65 | 179.20 | 184.70 |

Stock 1 is the control stock with 3 phr of bonding resin of B-19-SC along with corresponding phr of HMMM. The resin and HMMM were reduced to 0.75 and 0.14 phr in stocks 2 and 3 and they were totally eliminated in stocks 4 and 5. Six parts of C—S12 were added in stocks 2 and 4, and it increased to 10 phr for stocks 3 and 5.

Mixing procedures: The rubber stocks were mixed in three stages including masterbatch 1 (MB1), masterbatch 2 (MB2), and the final (FM). The details of mixing procedures for each mixing stage are shown in the following tables:

TABLE 15

MB1 fill factor = 0.72
Intital Temp 60-70 C.

Mixing rotor speed RPM = 50

| Step | |
|---|---|
| 1 | Charge polymers |
| 2 | Mix for 42 seconds |
| 3 | Charge 1 st cup of 40 phr of CB & 4 phr oil |
| 4 | Mix for 50 seconds |
| 5 | Charge rest of 15 phr of carbon black & 2phr oil and chemicals |
| 6 | Mix to 135 C. |
| 7 | Sweep RPM = 60 |
| 8 | Mix to 155 C. at 60 RPM |

TABLE 16

MB2 fill factor = 0.7
Initial temperature: 60-70 C.

Mixing rotor speed 50 rpm

| Step | |
|---|---|
| 1 | Charge MB1 rubber at a rotor speed of 50 rpm |
| 2 | Mix for 30 seconds |
| 3 | Charge B-19-SC and Mix to 120 C. |
| 4 | Sweep RPM = 55 rpm |
| 5 | Mix to 135 C. at 55 RPM |
| 6 | Drop at 135 C. |

TABLE 17

Final fill factor = 0.69
Initial temperature: 50-60 C. 122 F.-140 F.

Mixing rotor speed 45 rpm

| Step | |
|---|---|
| 1 | Charge MB2 rubber |
| 2 | Mix for 20 seconds: add HMMM and curatives Mix to 95 C. |
| 3 | Charge HMMM and curatives and mix to 95 C. |
| 4 | sweep RPM = 50 |
| 5 | Mix to 105 C. |
| 6 | Drop 105 C. |

All MB1 test stocks were allowed to cool overnight prior to starting MB2 mixing stage. Likewise, all MB2 test stocks were allowed to cool overnight prior to the final mixing stage. The finished mixed formulations were sheeted out and cured at 150 C for 20 minutes before they were tested (determined by the MDR curing curves).

Higher IS Content in a Tire Compound without Blooming, measuring the reversion of C-S12 to C-S8: The extent of C-S12 reversion in each stock was analyzed using reversed phase liquid chromatography with ultraviolet absorption (UV) detection to determine the amount of soluble sulfur in the uncured stocks. Total weight percent soluble sulfur is determined by reducing uncured rubber sample into small cut pieces, extracting soluble sulfur by sonication in 1,4-dioxane, then analyzing the filtered 1,4-dioxane supernatant by HPLC against external sulfur standards. The results are shown in Table 18, where only 1 to 1.4 wt % of C—S12 reverted to C—S8 due to mixing. This translated into about 0.05 to 0.124 wt % of C—S8 in the NR which is far lower than the sulfur solubility limit in NR, and significant blooming is not expected to occur after mixing. When these stocks are subjected to downstream processing such as calendaring, another 1-2 wt % of C—S12 might be expected to revert, resulting in an estimated total reversion of less than about 4% reversion. This is still about 0.16 wt % of C—S8 in NR, which is much lower than the solubility limit of 1.2 wt % in NR. Therefore, no blooming is expected to occur in the post processing prior to curing.

TABLE 18

Soluble sulfur content analysis

| | | Stock | | | | |
|---|---|---|---|---|---|---|
| | | 1 | 2 | 3 | 4 | 5 |
| IS in rubber | phr | 4 | 6 | 10 | 6 | 10 |
| soluable sulfur in rubber | wt % | 0.027 | 0.039 | 0.052 | 0.047 | 0.067 |
| soluable sulfur in rubber | phr | 0.050 | 0.070 | 0.097 | 0.084 | 0.124 |
| wt % of SS in NR | wt % | 0.050 | 0.070 | 0.097 | 0.084 | 0.124 |
| Wt % of IS reverted | wt % | 1.242 | 1.171 | 0.965 | 1.404 | 1.238 |

Processing evaluation: The processing of each stock was evaluated by the compound Mooney and Mooney scorch measurements. Mooney viscosity was measured on the uncured FM stocks using an MV 2000 Mooney viscometer from Alpha Technologies, following the ASTM-D1646 test method. The sample was preheated to 100° C. for 1 min. Mooney viscosity (ML1+4; large rotor) was recorded as the torque after the rotor had rotated for 4 min at 2 rotations per minute (rpm; average shear rate about 1.6 s−1). Mooney scorch was measured in a similar fashion as Mooney viscosity on the uncured FM stocks, but conducted at a temperature of 130° C. The ASTM-D1646 test method was followed. Using a small rotor, torque versus time was recorded, and the time values were reported when the torque values increased 2 points (t2), 5 points (t5), and 35 points (t35) above the minimum. t5 was taken as the Mooney scorch, which is the measure of the safety margin of the compound viscosity during the processing before curing. Longer t5 time allows compounds to be processed with fewer processing issues related to compound viscosity change. The Mooney and Mooney scorch data are shown in Table 3.

The t5 of stocks with reduced resin or resin free stocks were comparable to the control at about 8 minutes. Therefore, we do not expect any significant operational difficulty in downstream processing at a temperature of 130° C. within 8 minutes.

The overall compound viscosity of the stocks with reduced-resin, or containing no resin were lower, which favors the downstream processing such as the calendaring. Lower compound viscosity may reduce the heat buildup due to the viscous heating during calendaring and allow faster but cooler calendaring processes.

TABLE 19

Mooney and Mooney Scorch Data

| | | Stock | | | | |
|---|---|---|---|---|---|---|
| | | 1 | 2 | 3 | 4 | 5 |
| ML Viscosity 100 C. | | | | | | |
| Final Viscosity ML1 + 4 | MU | 69.9 | 65.4 | 64 | 64.1 | 61.5 |
| ML Scorch 130 C. | | | | | | |
| t2 | m.m | 6 | 7.1 | 7.2 | 7.9 | 7 |
| t5 | m.m | 7.7 | 7.9 | 8 | 8.2 | 7.7 |
| t35 | m.m | 12.9 | 10.3 | 10 | 9.4 | 9.2 |
| ML(1 + 4) | MU | 64.1 | 56.3 | 55.9 | 53.2 | 51.5 |

Compound curing was characterized using a moving die rheometer (MDR 2000) from Alpha Technologies following ASTM-F5289 standard procedure at 150° C. on uncured FM stocks. Torque versus time was recorded for 60 min. Minimum torque (ML) and maximum torque (MH) were recorded. A cure point of 90% (T90) was calculated from the maximum torque value. Selected curing characteristics of all FM stocks are listed in Table 4. A curing condition of 150° C. and 20 minutes was then prescribed for vulcanizing all the stocks accordingly.

TABLE 20

Curing characteristics measured by MDR at 150° C.

| MDR 150 C. | | Stock | | | | |
|---|---|---|---|---|---|---|
| | | 1 | 2 | 3 | 4 | 5 |
| ML | dNm | 3.28 | 2.85 | 2.83 | 2.72 | 2.58 |
| MH | dNm | 33.21 | 26.8 | 41.42 | 26.8 | 40.08 |
| Delta Torque | dNm | 29.93 | 23.95 | 38.59 | 24.08 | 37.5 |
| ts2 | minutes | 1.54 | 2.3 | 2.05 | 2.14 | 1.93 |
| t10 | minutes | 2.1 | 2.48 | 2.59 | 2.39 | 2.51 |
| t50 | minutes | 6.49 | 5.4 | 5.8 | 5.48 | 5.71 |
| t90 | minutes | 15.42 | 12.81 | 13.68 | 12.71 | 13.3 |

Compound property evaluation: Heat-build and deformation softening measured by compression flexing: The heat buildup of the rubber article was evaluated by the compression flexing measurement using the Goodrich Flexometer manufactured by Ferry Machine, Kent, Ohio. Test specimen was a cylindrical pallet with a dimension of 1" in height and ¾" in diameter. The dynamic test was performed following procedures in ASTM D 623-99 at a compression mode with a frequency of 30 hertz under a constant load of 11 kg at temperatures of interest for thirty minutes. The stroke had been preset to 4.45 mm. The typical test data are listed in Table 5 where:
Needle Temperature: the center temperature of the specimen at test end.
End Temperature: The temperature of the lower sample holder at test tend.
Delta T: Temperature difference at the lower sample holder before and after test end.
Permanent set: Deformation of the specimen after test end.
Statistic compression: static deformation of the specimen in % (measured in the testing area)
Initial flexing compression: dynamic deformation after 5 seconds of testing time in %.
Final flexing compression: dynamic deformation after test end in %.
Creep: Ft=100%×($h_6$−$h_t$)/$h_0$1 $h_6$: deformation after 6 seconds, $h_0$=deformation after start, $h_t$=deformation after test end The heat buildup was faster and higher in the control stock and lower in the stocks with higher amounts of sulfur compounded. Heat buildup evaluation of the belt skim compound is important because it is indicative of how much heat would be generated during tire service. Higher extent of heat buildup in a tire during service is detrimental to the tire durability and may accelerate the tire failure prematurely. With the significantly less heat buildup (40% lower) seen in stocks 3 and 5 containing higher amounts of sulfur (10 phr), it is expected that the tire will run cooler and have improved durability in service. The needle temperature which is the temperature measurement inside the sample even shows bigger difference between the control and stocks 3 and 5 which is 30° C. cooler in the high-sulfur filled rubbers. Data of permanent set, static and dynamic compression, and creep in Table 21 show the larger deformation softening of the control stock with improvements when higher amounts of sulfur were compounded. It appears that the modulus buildup by the plastic network is not stable upon mechanical aging and most of it cannot be recovered. On the other hand, the deformation softening in the high-sulfur filled compounds (stocks 3 and 5) are only 50% of the control. Therefore, the compound stiffness increased by the increasing rubber network appears to retain better than those by bonding resin.

TABLE 21

The Heat Buildup Evaluated by the Compression Flexometer.

| | | Stock | | | | |
|---|---|---|---|---|---|---|
| | | 1 | 2 | 3 | 4 | 5 |
| Chamber Temp: 100 C. | | | | | | |
| Needle Temperature | deg C. | 169.35 | 144.95 | 137.9 | 147.4 | 136.85 |
| End Temperature | deg C. | 116.45 | 109.2 | 106.15 | 109.95 | 106.3 |
| Delta T | deg C. | 27.75 | 19.95 | 16.8 | 20.15 | 16.9 |
| Permanent Set Hot | −% | 17.75 | 11.8 | 8.05 | 13.85 | 9.5 |
| Static Compression | −% | 10.6 | 11.25 | 6.95 | 11.3 | 7.5 |
| Init Flex Compression | −% | 5.4 | 3.35 | 1.35 | 3.45 | 0.85 |
| Final Flex Compression | −% | 19.75 | 13.25 | 5.75 | 14.95 | 6.9 |
| Creep | +% | 14.345 | 9.93 | 7.105 | 11.53 | 7.725 |
| Chamber Temp: 40 C. | | | | | | |
| Needle Temperature | deg C. | 109.25 | 98.8 | 92.8 | 99.2 | 95.65 |
| End Temperature | deg C. | 65.2 | 61.1 | 57.05 | 61.55 | 59.25 |
| Delta T | deg C. | 28.2 | 23.65 | 19.4 | 23.8 | 21.35 |
| Permanent Set Hot | −% | 7.95 | 3.9 | 2.5 | 5.05 | 3.3 |
| Static Compression | −% | 9.5 | 11.3 | 6.65 | 11.9 | 7.35 |
| Init Flex Compression | −% | 6.2 | 4.05 | 0.9 | 4.45 | 0.6 |
| Final Flex Compression | −% | 11.85 | 6.75 | 1.4 | 7.9 | 1.5 |
| Creep | +% | 5.655 | 2.685 | 0.94 | 3.47 | 2.125 |

Dynamic mechanical property measurements on vulcanized rubbers; Dynamic Strain Sweeps on Cured FM Stocks: An RPA 2000 (Rubber Process Analyzer) made by Alpha Technology was used to measure the strain sweeps on the cured FM stocks. The conditions for strain sweep are of a temperature of 60° C., a frequency of 1 Hz, and strain amplitudes from 0.1% to 25%. The curing was conducted at 150° C. for 20 min with the sample sitting in the RPA die cavity and rested therein at 40° C. for 10 minutes before testing. The sample experienced deformation from low strain (0.1%) to higher strain (25%), and then the sample was swept back from the high strain of 25% to the low strain of 0.1% to monitor the modulus recovery of the rubber compound. This process was repeated for the second time and a third sweep was performed after the sample recovered from the 2nd sweep.

The 1st sweep data for samples free of mechanical history are in Table 22 where the dynamic storage modulus (G') was plotted against the deformation strain amplitude for every stock. At a low strain of 0.2%, the G' of the control stock with resin was about 20% higher than those with reduced resin (stock 3) and without resin (stock 5). However, the differences between stocks 1 and 3 or 5 shrank with increasing deformation level until a strain amplitude of 8-9% where the G' of stocks 3 and 5 were higher than that of stock 1. At the high strain of 25%, the G' of stocks 3 and 5 were about 36% higher than stock 1. In other words, stock 1 became softer upon larger deformation and its modulus was more strain dependent than stocks 3 and 5. For tires in service, less stiffness deformation dependence is more desirable in order to attain more consistent performance. Therefore, it is expected that tires with compounds containing stocks 3 and 5 will perform more consistently than stock 1 with resin. The G' of stocks 2 and 4 are not up to the level of stocks 1, 3, and 5, and are not of interest in application. However, the comparisons amongst stocks 2, 3, 4, and 5 indicates that a higher dosage of sulfur (10 phr) was required to build enough rubber network in stocks 3 and 5 to attain G' comparable to that by the resin network in stock 1.

G' Softening Behavior: Now, it is of interest to see the G' strain dependence of these stocks after they recovered from a high degree of deformation. This is done by following the G' strain dependence (2nd sweep) after a strain sweep from a high strain of 25% to a low strain of 0.2% was performed on the sample (Table 22). It is surprising to observe that stocks 1, 3, 5 are recovered to the same G' level at lower strains even the G' of stock 1 is much larger in the 1st sweep. The advantage of higher G' in the 1 st sweep of stock 1 now disappears in the second sweep where G' of the stocks 3 and 5 are equal to stock 1 at strain lower than 0.5% but higher afterwards. Apparently, the G' build by the rubber network is much stabler and stronger than that by the hard filler or resin network. The difference between the 1 st and 2nd sweep is apparent larger in the stock 1 when compared to those of stocks 3 and 5. This G' difference (δG') is often termed as the stiffness softening when the rubber article is subjected to deformation in tire service and it is less desirable to see the large extent of softening during the tire in service. The extent of softening of stocks 1, 3, and 5 can be seen in Table 22, with the normalized G' softening as a function of deformation amplitude. Note that there are about 30-42% G' loss in the stock 1 with full resin, but there are only 15-25% G' loss in the resin free (stock 5) or resin less (stock 3) but contain higher sulfur (10 phr). These data are consistent with those in Table 5 where a large extent of deformation softening was seen in the creep, flex compression, and permanent set from flex compression experiments.

Second, the difference in G' (ΔG') between the low (0.2%) and high strain (25%) is usually viewed as the measure of the network of hard component such as filler or resin. For stock 1, the carbon black and bonding resin networks contribute to the (ΔG'), while it is less (stock 3) or no contrition (stock 5) from resin for stocks 3 and 5, respectively. The loss in ΔG' (δ(ΔG')) due to the breakage of filler and resin network upon deformation was compared against the resin content (in phr) where δ(ΔG') increases with increasing bonding resin presence in the rubber. It appears in the stock 5 without resin, the carbon black network recovers much better than those with bonding resin. In other words, there are permanent network loss in the bonding resin network in stocks 1 and 3 and it may be the reason a large extent of deformation softening seen in stock 1.

Example 8

As noted, thermal stability refers to the resistance of a sulfur to thermally induced conversion reactions from either polymeric sulfur or cyclododecasulfur to cyclooctasulfur. Chemical degradation pathways exist wherein nucleophilic or free radical species interact with the insoluble forms of sulfur and promote the formation of cyclooctasulfur. For example, the degradation products from vulcanization accelerators such as from 2,2'-mercaptobenzothiazole disulfide or sulfenamide accelerators derived from 2-mercaptobenzothiazoles, or dithiocarbamates, thiurams, xanthate or other accelerators, promote the decomposition of polymeric sulfur, liberating cyclooctasulfur which partakes in the vulcanization reactions. We have shown that cyclododecasulfur when combined with N-(cyclohexylthiol) phthalimide (CTP) has surprisingly greater chemical stability than conventional polymeric sulfur. The level of chemical and thermal stability is quite high at very high cyclododecasulfur levels and even when combined with extremely high levels of vulcanization accelerators. For example, in the masterbatch MB-1 we combined vulcanization ingredients at high levels in an internal mixer according to the mixing sequence. After mixing, samples of the vulcanizable elastomeric composition were subjected to a mechanical heat treatment using the RPA. Treatment temperatures and times were 120° C. for 10 minutes, 120° C. for 15 minutes, 130° C. for 10 minutes and 130° C. for 15 minutes. After the thermal mechanical treatment, the samples were collected and analyzed for cyclooctasulfur content by HPLC. The following table shows the % reversion of the insoluble sulfur to cyclooctasulfur for each condition, for formulations with and without CTP.

The formulations without reinforcing resin exhibited reduced viscosity allowing for significantly easier processing. Compounds containing cyclododecasulfur exhibit reduced reversion compared to conventional polymeric sulfur. Combining CTP into the formulation improves the reversion of conventional polymeric sulfur by about 25%. For cyclododecasulfur in the presence of CTP, reversion is reduced on the order of 50-75% even when the sulfur is up to three-fold higher and accelerator loading is up to six fold higher. Formulations with CTP plus cyclododecasulfur can be processed at higher temperatures, and if necessary for longer times, compared to cyclododecasulfur-containing formulations without CTP. Formulations with cyclododecasulfur or cyclododecasulfur plus CTP show better thermal stability or better thermal and chemical stability compared to formulations which employ conventional polymeric sulfur. When high loadings of sulfur and accelerator are used in place of resinous curing agents, the durability of the resultant network is superior.

TABLE 22

| | | Vulcanization formulation in phr | | | | | | | |
|---|---|---|---|---|---|---|---|---|---|
| Polymeric Sulfur | phr | 5.0 | | | | | | | |
| Cyclododecasulfur | phr | | 15.0 | 11.0 | 15.0 | 7.5 | 15.0 | 6.0 | 8.0 |
| DCBS | phr | 1.0 | 6.0 | 11.0 | 7.5 | 7.5 | 15.0 | 12.0 | 12.0 |
| CTP | phr | 0.0 | 0.0 | 0.0 | 0.0 | 0.0 | 0.0 | 0.0 | 0.0 |
| Penacolite B-19S | phr | 4.0 | 0.0 | 0.0 | 0.0 | 0.0 | 0.0 | 0.0 | 0.0 |
| HMMM | phr | 3.0 | 0.0 | 0.0 | 0.0 | 0.0 | 0.0 | 0.0 | 0.0 |
| | | Compound Viscosity @ 121 C. | | | | | | | |
| Minimum Viscosity | MU | 64.1 | 47.5 | 44.2 | 46.9 | 46.7 | 41.1 | 43.2 | 43.2 |
| Temperature C. | Time Min. | Thermal Mechanical Treatment % Reversion | | | | | | | |
| 120.0 | 10.0 | 39.7 | 4.7 | 7.9 | 5.6 | 11.0 | 12.5 | 15.3 | 13.5 |
| 120.0 | 15.0 | 53.5 | 10.2 | 18.7 | 11.9 | 23.2 | 29.4 | 34.2 | 29.6 |
| 130.0 | 10.0 | 94.0 | 72.6 | 72.7 | 65.5 | 83.9 | 92.6 | 83.0 | 82.3 |
| 130.0 | 15.0 | 96.1 | 92.7 | 85.9 | 89.9 | 83.8 | 79.9 | 86.2 | 83.7 |
| | | Fraction Retained Modulus | | | | | | | |
| G' @ 2% Strain (1st Sweep) | kPa | 8884 | 7096 | 7586 | 7281 | 6668 | 6269 | 5991 | 7215 |
| G' @ 2% Strain (2nd Sweep) | kPa | 4429 | 5866 | 5994 | 5981 | 5400 | 5135 | 5014 | 5844 |
| Fraction Retained | 2% Strain | 0.498 | 0.827 | 0.790 | 0.822 | 0.810 | 0.819 | 0.837 | 0.810 |
| | | Vulcanization formulation in phr | | | | | | | |
| Polymeric Sulfur | phr | 5.0 | | | | | | | |
| cyclododecasulfur | phr | | 15.0 | 11.0 | 15.0 | 7.5 | 15.0 | 6.0 | 8.0 |
| DCBS | phr | 1.0 | 6.0 | 11.0 | 7.5 | 7.5 | 15.0 | 12.0 | 12.0 |
| CTP | phr | 0.2 | 0.2 | 0.2 | 0.2 | 0.2 | 0.2 | 0.2 | 0.2 |
| Penacolite B-19S | phr | 4.0 | 0.0 | 0.0 | 0.0 | 0.0 | 0.0 | 0.0 | 0.0 |
| HMMM | phr | 3.0 | 0.0 | 0.0 | 0.0 | 0.0 | 0.0 | 0.0 | 0.0 |
| | | Compound Viscosity @ 121 C. | | | | | | | |
| Minimum Viscosity | MU | 62 | 42.1 | 38.5 | 40.7 | 40.6 | 36 | 37.7 | 38 |
| Temperature C. | Time Min. | Thermal Mechanical Treatment % Reversion | | | | | | | |
| 120.0 | 10.0 | 29.7 | 2.7 | 2.9 | 2.6 | 3.5 | 3.2 | 3.8 | 2.9 |
| 120.0 | 15.0 | 34.6 | 4.6 | 5.5 | 4.4 | 6.0 | 5.7 | 9.2 | 6.2 |
| 130.0 | 10.0 | 89.3 | 24.3 | 27.8 | 23.8 | 30.8 | 29.3 | 38.7 | 29.7 |
| 130.0 | 15.0 | 86.3 | 63.3 | 73.0 | 63.8 | 63.4 | 71.8 | 74.6 | 67.0 |
| | | Fraction Retained Modulus | | | | | | | |
| G' @ 2% Strain (1st Sweep) | kPa | 9396 | 7194 | 7777 | 7640 | 6291 | 6619 | 6077 | 7015 |
| G' @ 2% Strain (2nd Sweep) | kPa | 4487 | 6051 | 6119 | 6231 | 5115 | 5404 | 5123 | 5696 |
| Fraction Retained | 2% Strain | 0.478 | 0.841 | 0.787 | 0.816 | 0.813 | 0.816 | 0.843 | 0.812 |

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A vulcanizable elastomeric formulation comprising:
at least one elastomer;
a vulcanizing agent comprising cyclododecasulfur; and
a prevulcanization inhibitor, present in an amount from about 0.01 phr to about 10.0 phr.

2. The vulcanizable elastomeric formulation of claim 1, wherein the prevulcanization inhibitor comprises one or more of: a sulfenamide, a sulfonamide, a sulfamide, a bis-thioimide, a thiocycloamide, a thioamide, a poly(thioamide), an N-hydrocarbylthio(amide), or a polysulfide.

3. The vulcanizable elastomeric formulation of claim 1, wherein the prevulcanization inhibitor comprises N-(cyclohexylthio) phthalimide.

4. The vulcanizable elastomeric formulation of claim 1, wherein the prevulcanization inhibitor is present in an amount from 0.02 phr to 8 phr.

5. The vulcanizable elastomeric formulation of claim 1, wherein the prevulcanization inhibitor is present in an amount from 0.05 phr to 5 phr.

6. The vulcanizable elastomeric formulation of claim 1, wherein the vulcanizable elastomeric formulation further comprises a reinforcing resin, formed of a methylene acceptor and a methylene donor, present in an amount of no more than 2 phr.

7. The vulcanizable elastomeric formulation of claim 1, wherein the amount of cyclododecasulfur in the formulation is from 1 to 25 phr.

8. The vulcanizable elastomeric formulation of claim 1, wherein the amount of cyclododecasulfur in the formulation is from 1.5 phr to 20 phr.

9. The vulcanizable elastomeric formulation of claim 1, wherein the amount of cyclododecasulfur in the formulation is from 2 phr to 15 phr.

10. A vulcanized elastomeric article formed from the vulcanizable elastomeric formulation of claim 1.

11. A process for forming a vulcanized elastomeric article, comprising:
   a) mixing an elastomer with a vulcanizing agent and a prevulcanization inhibitor, present in an amount from about 0.01 phr to about 10.0 phr, to form a vulcanizable elastomeric formulation that includes the vulcanizing agent dispersed in the elastomer; (b) forming the vulcanizable elastomeric formulation into a formed shape; and (c) vulcanizing the formed shape to form the vulcanized elastomeric article; wherein the vulcanizing agent comprises cyclododecasulfur, and wherein at least one of the mixing and forming steps comprises increasing the bulk average processing temperature of said vulcanizable elastomeric formulation to greater than 125° C. for at least a portion of said step.

12. The process of claim 11, wherein at least one of the mixing and forming steps comprises increasing the bulk average processing temperature of said vulcanizable elastomeric formulation to greater than 128° C. for at least a portion of said step.

13. The process of claim 11, wherein at least one of the mixing and forming steps comprises increasing the bulk average processing temperature of said vulcanizable elastomeric formulation to greater than 130° C. for at least a portion of said step.

14. The process of claim 11, wherein said vulcanizable elastomeric formulation further comprises an antireversion agent.

15. The process of claim 14, wherein said antireversion agent comprises one or more of: hexamethylene-1,6-bis (thiosulfate), disodium salt, dihydrate and 1,3-bis(citraconamidomethyl)benzene.

16. The process of claim 11, wherein the prevulcanization inhibitor comprises N-(cyclohexylthio) phthalimide.

17. The process of claim 16, wherein the vulcanized elastomeric article is in the form of a tire.

* * * * *